United States Patent
Kobatake et al.

(10) Patent No.: US 6,544,301 B2
(45) Date of Patent: Apr. 8, 2003

(54) METHOD AND APPARATUS FOR MANUFACTURING SOLID ELECTROLYTIC CAPACITOR

(75) Inventors: Yasuhiro Kobatake, Osaka (JP); Yukari Shimamoto, Kyoto (JP); Mitsuo Tadokoro, Osaka (JP); Isao Kaneko, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/861,958

(22) Filed: May 21, 2001

(65) Prior Publication Data

US 2001/0052172 A1 Dec. 20, 2001

Related U.S. Application Data

(63) Continuation of application No. 09/505,372, filed on Feb. 16, 2000, now Pat. No. 6,293,974.

(30) Foreign Application Priority Data

Feb. 17, 1999 (JP) ............................................. 11-038343

(51) Int. Cl.⁷ .......................... H01G 9/00; C25D 17/00; C25D 13/00; C25D 15/00; C25D 1/12
(52) U.S. Cl. ....................... 29/25.03; 204/200; 204/208; 204/209; 204/210; 204/226; 204/626
(58) Field of Search ........................... 29/25.3; 204/200, 204/208, 209, 210, 226, 626

(56) References Cited

U.S. PATENT DOCUMENTS

| 4,085,435 A | 4/1978 | Galvagni |
| 4,110,815 A | 8/1978 | Frade et al. |
| 4,531,281 A | * 7/1985 | Murray et al. ............. 29/25.03 |
| 4,642,876 A | * 2/1987 | Murray et al. ............. 228/160 |
| 4,785,380 A | 11/1988 | Harakawa et al. |
| 4,805,074 A | 2/1989 | Harakawa et al. |
| 4,934,033 A | 6/1990 | Harakawa et al. |

(List continued on next page.)

FOREIGN PATENT DOCUMENTS

| JP | 59-23889 | 2/1984 |
| JP | 60-137923 | 7/1985 |
| JP | 62-165313 | 7/1987 |
| JP | 63-158829 | 7/1988 |

*Primary Examiner*—David E. Graybill
(74) *Attorney, Agent, or Firm*—RatnerPrestia

(57) ABSTRACT

(a) supplying a capacitor element manufacturing apparatus, in which the capacitor element manufacturing apparatus includes a polymerization tank, a polymerization solution contained in the polymerization tank, and a negative electrode put in the polymerization solution in the polymerization tank, (b) supplying a core material having a plurality of capacitor elements, in which each capacitor element of the plurality of capacitor elements has an anode lead-out portion and a cathode lead-out portion, (c) forming a formation film on the surface of the core material, (d) installing a conductive substance on the formation film, (e) adhering each anode lead-out portion of the plurality of capacitor elements having the conductive substance to a conductive tape, (f) immersing the core material having the anode lead-out portion adhered to the adhesive tape in the polymerization solution, and (g) forming a polymerization film on the cathode lead-out portion of the capacitor element by applying a voltage to the conductive tape are included. By applying a voltage to this conductive tape, the polymerization reaction starts from the surface of the conductive tape, and this polymerization spreads to the cathode lead-out portion of each capacitor of the plurality of capacitors. Polymerization films are formed simultaneously on the cathode lead-out portions of the capacitor elements. As a result, the productivity is notably enhanced.

35 Claims, 21 Drawing Sheets

U.S. PATENT DOCUMENTS

| | | |
|---|---|---|
| 5,428,500 A | 6/1995 | Nishiyama et al. |
| 5,432,029 A | 7/1995 | Mitate et al. |
| 5,443,602 A | 8/1995 | Kejha |
| 5,473,503 A | 12/1995 | Sakata et al. |
| 5,597,658 A * | 1/1997 | Kejha ........................ 29/623.5 |
| 5,769,907 A * | 6/1998 | Fukuda et al. .............. 29/25.03 |
| 6,113,755 A * | 9/2000 | Tanahashi et al. .......... 204/206 |
| 6,134,773 A * | 10/2000 | Kejha ........................ 29/623.1 |
| 6,293,974 B1 * | 9/2001 | Kobatake et al. .......... 29/25.03 |
| 6,368,363 B1 * | 4/2002 | Kobatake et al. .......... 29/25.03 |
| 2001/0009054 A1 * | 7/2001 | Yamada et al. ............. 29/25.03 |
| 2001/0011635 A1 * | 8/2001 | Terada et al. ................ 204/194 |
| 2001/0042687 A1 * | 11/2001 | Yoshimura et al. ............ 205/83 |
| 2001/0052172 A1 * | 12/2001 | Kobatake et al. .......... 29/25.03 |

* cited by examiner

METHOD AND APPARATUS FOR MANUFACTURING SOLID ELECTROLYTIC CAPACITOR

This application is a Continuation of Ser. No. 09/505,372, filed Feb. 16, 2000 U.S. Pat. No. 6,293,974.

FIELD OF THE INVENTION

The present invention relates to a method and apparatus for manufacturing a solid electrolytic capacitor having a solid electrolyte.

BACKGROUND OF THE INVENTION

Recently, as the power source circuit of an electronic appliance is becoming higher in frequency, an electrolytic capacitor having an excellent high frequency characteristic is demanded. To meet this demand, in order to realize a low impedance in a high frequency region, a solid electrolytic capacitor using a conductive high polymer of high conductivity obtained by electrolytic polymerization as solid electrolyte.

In a conventional solid electrolytic capacitor, when forming a polymerization film of high polymer by electrolytic polymerization simultaneously on a cathode lead-out portion of a plurality of capacitor elements, as shown in FIG. 22, an electrolytic polymerization must be performed in a polymerization solution 1, by setting a current feeding electrode 3 to contact with each anode lead-out portion 2, with this electrode 3 used as the positive electrode, and applying a voltage between the positive electrode 3 and a negative electrode 4.

In the conventional manufacturing method of solid electrolytic capacitor, however, a polymerization electrode 3 must be prepared for each capacitor element, and it requires a complicated process of making contact between each polymerization electrode 3 and anode lead-out portion 2. It was hence difficult to mass-produce efficiently.

The invention presents a manufacturing method of solid electrolytic capacitors suited to mass production.

SUMMARY OF THE INVENTION

A manufacturing method of solid electrolytic capacitor of the invention comprises:
(a) a step of supplying a capacitor element manufacturing apparatus,
   in which the capacitor element manufacturing apparatus includes a polymerization tank, a polymerization solution contained in the polymerization tank, and a negative electrode put in the polymerization solution in the polymerization tank,
(b) a step of supplying a core material having a plurality of capacitor elements,
   in which each capacitor element of the plurality of capacitor elements has an anode lead-out portion and a cathode lead-out portion,
(c) a step of forming a formation film on the surface of the core material,
(d) a step of installing a conductive substance on the formation film,
(e) a step of adhering each anode lead-out portion of the plurality of capacitor elements having the conductive substance to a conductive tape,
(f) a step of immersing the core material having the anode lead-out portion adhered to the adhesive tape in the polymerization solution, and
(g) a step of forming a polymerization film on the cathode lead-out portion of the capacitor element by applying a voltage to the conductive tape.

A manufacturing apparatus of solid electrolytic capacitor of the invention comprises:
   a supplying device for supplying a core material having a plurality of capacitor elements,
   in which each capacitor element of the plurality of capacitor elements has an anode lead-out portion and a cathode lead-out portion,
   a formation film forming device for forming a formation film on the surface of the core material,
   a conductive substance forming device for installing a conductive substance on the formation film,
   an adhering device for adhering the plurality of capacitor elements having the conductive substance to a conductive tape,
   a polymerization device for forming a conductive polymerization film on the surface of the cathode lead-out portion of core material adhered to the conductive tape, and
   a peeling device for peeling the conductive tape from the core material forming the polymerization film.
   Preferably, the core material has a band shape.
   Preferably, the polymerization tank has a long shape.
   By applying a voltage to this conductive tape, the polymerization reaction starts from the surface of the conductive tape, and this polymerization spreads to the cathode lead-out portion of each capacitor of the plurality of capacitors. Thus, polymerization films are formed simultaneously on the cathode lead-out portions of the capacitor elements. As a result, the productivity is notably enhanced.

REFERENCE NUMERALS

Figure 1:
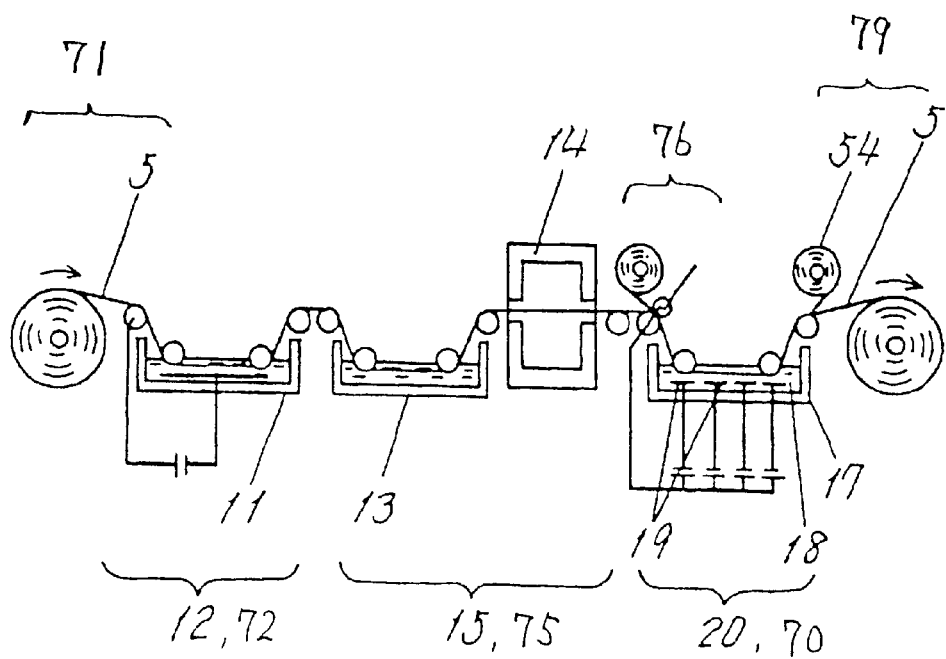
FIG. 1 is a block diagram of a manufacturing method of solid electrolytic capacitor in an embodiment of the invention.

5 Core material
6 Slit
7 Capacitor element
8 Insulating tape
9 Anode lead-out portion
10 Cathode lead-out portion
16 Conductive tape
17 polymerization tank
18 Polymerization solution
19 Negative electrode
23 First driven roller
24 First tension roller
25 Through-shaft
26 Ball bearing
27 Drive shaft
28 Lid
29 Spacer
30 Weir
31 First current feed roller
33 Dust collecting squeegee
34 Second driven roller
35 Third driven roller
36 Separator
37 Reel
38$a$, 38$b$ Second tension roller
39 Position defining plate
42 Voltage application terminal
45 Peeling roller
46 Cracking roller
47 First peeling pawl
48 Second peeling pawl
49 Roller
50 Suction means
51 Second current feed roller
53$a$, 53$b$ Tension roller
70 Polymerization device
71 Supplying device
72 Formation film forming device
75 Conductive substance forming device
76 Adhering device
79 Peeling device

DETAILED DESCRIPTION OF THE INVENTION

A manufacturing method of solid electrolytic capacitor of the invention comprises:

(a) a step of supplying a polymerization tank, a polymerization solution contained in the polymerization tank, and a negative electrode put in the polymerization solution in the polymerization tank, (b) a step of supplying a core material having a plurality of capacitor elements, each capacitor element of the plurality of capacitor elements having an anode lead-out portion and a cathode lead-out portion, (c) a step of forming a formation film on the surface of the core material, (d) a step of installing a conductive substance on the formation film, (e) a step of adhering each anode lead-out portion to a conductive tape, (f) a step of immersing the core material adhered to the adhesive tape in the polymerization solution, and (g) a step of forming a polymerization film on the cathode lead-out portion of the capacitor element by applying a voltage to the conductive tape.

In this constitution, by applying a voltage to the conductive tape, the polymerization reaction starts from the surface of the conductive tape, and this polymerization spreads to each cathode lead-out portion, and polymerization films are formed on the cathode lead-out portions of the capacitor elements. By this constitution, the productivity is notably enhanced.

A manufacturing apparatus of solid electrolytic capacitor of the invention comprises:

a supplying device for supplying a core material having a plurality of capacitor elements, in which each capacitor element of the plurality of capacitor elements has an anode lead-out portion and a cathode lead-out portion, a formation film forming device for forming a formation film on the surface of the core material, a conductive substance forming device for installing a conductive substance on the formation film, an adhering device for adhering the plurality of capacitor elements having the conductive substance to a conductive tape, a polymerization device for forming a conductive polymerization film on the surface of the cathode lead-out portion of core material adhered to the conductive tape, and a peeling device for peeling the conductive tape from the core material forming the polymerization film.

In this constitution, solid electrolytic capacitors having excellent capacitor characteristics are obtained. Further, the polymerization film is formed easily, and the productivity is notably enhanced.

Preferably, the core material has a band shape, the step of supplying the core material includes a step of projecting and forming the plurality of capacitor elements integrally in a direction orthogonal to the longitudinal direction, in the longitudinal direction of the core material, and each anode lead-out portion is positioned at the projected root side of each capacitor element. In this constitution, when forming the polymerization film, the plurality of capacitor elements can be handled as one body. Hence, the productivity is further enhanced.

Preferably, the step of supplying the core material includes a step of projecting and forming the capacitor elements integrally in a direction orthogonal to the longitudinal direction of the core material, at both sides of the longitudinal direction of the band-shaped core material. In this constitution, when forming the polymerization film, the plurality of capacitor elements can be handled as one body. Hence, the productivity is further enhanced.

Preferably, the core material has a band shape, the step of supplying the core material includes a step of forming a plurality of slits in the direction orthogonal to the longitudinal direction, at every specific interval in the longitudinal direction of the core material, and each capacitor element is formed between slits. In this constitution, by the step of forming only slits at specific intervals in the longitudinal direction of the band shape, a plurality of capacitor elements can be formed easily.

Preferably, the core material has a band shape, the step of supplying the core material includes a step of forming integrally the plurality of capacitor elements projected in the direction orthogonal to the longitudinal direction, in the longitudinal direction of the band-shaped core material, the anode lead-out portion is positioned at the root side of the plurality of projected capacitor elements, and the conductive tape is adhered to the surface of the anode lead-out portion. In this constitution, by adhering the conductive tape in the longitudinal direction of the band-shaped core material, the distance between the cathode lead-out portion and conductive tape of each capacitor element is stable, so that a nearly homogeneous polymerization film is formed in the cathode lead-out portion of each capacitor element.

The manufacturing method of solid electrolytic capacitor further includes a step of adhering a long insulating tape in the central region in the longitudinal direction of the band-shaped core material, and the conductive tape is adhered to the insulating tape. In this constitution, since this insulating tape surface has a smoother flatness than the core material on which the formation film is formed, it is easier to adhere the conductive film. At a later step, this conductive tape can be easily peeled from the core material. As a result, the productivity is improved. Moreover, since the anode lead-out portion and cathode lead-out portion underneath the conductive tape of each capacitor element are separated by the insulating tape, the polymerization film formed on the negative electrode hardly invades into the anode lead-out portion side.

The polymerization tank has a long shape. By forming the polymerization tank in a long shape, the volume of polymerization solution for immersing the conductive tape in the state of adhering of the core material can be decreased.

The long-shaped polymerization tank has a plurality of long-shaped polymerization tanks installed in parallel, and the step of immersing the core material in the polymerization solution includes a step of immersing the band-shaped core material having the anode lead-out portion adhered to the conductive tape in each polymerization solution in each long-shaped polymerization tank of the plurality of long-shaped polymerization tanks. In this constitution, the productivity is notably enhanced.

The band-shaped core material to which the conductive tape is adhered moves so as to get into the polymerization tape from one end side of the long-shaped polymerization tank, and go out of the polymerization solution from other end side. In this constitution, in the polymerization tank, the polymerization film can be formed sequentially and continuously in the cathode lead-out portion of each capacitor element from one side to other side. Further, after formation of polymerization film, the core material forming the polymerization film can be drawn out from the polymerization tank and move to the next step. As a result, the productivity is improved.

The polymerization solution flows into the polymerization tank from one end side of the long-shaped polymerization tank, and flows out of the polymerization tank from the other end side of the polymerization tank. In this constitution, drop of concentration of polymerization solution in the polymerization tank is suppressed, and polymerization films can be formed stably.

The core material to which the conductive tape is adhered gets into the polymerization solution from one end side of the long-shaped polymerization tank, and moves to go out of the polymerization solution from other end side, and the polymerization solution flows into the polymerization tank from one end side of the long-shaped polymerization tank, and flows out of the polymerization tank from the other end side of the polymerization tank, and the flow speed of the polymerization solution and the moving speed of the core material are nearly the same. By nearly equalizing the speed of the polymerization solution and core material moving from one side to other side of the polymerization tank, the relative state of each capacitor element of the core material and the polymerization contacting therewith is almost constant, and in this state of a stagnant state where both remain still, the polymerization film is formed. As a result, the polymerization film may be easily formed in the cathode forming portion of each capacitor element.

The capacitor element manufacturing apparatus includes a first driven roller installed at one side in the polymerization tank, and a first tension roller installed at other side in the polymerization tank, and at least the lower part of the first driven roller is immersed in the polymerization solution, and at least the lower part of the first tension roller is immersed in the polymerization solution and the band-shaped core material to which the conductive tape is adhered abuts against the lower part of the first driven roller and the lower part of the first tension roller, and is moved from one side to other side of the polymerization tank. In this constitution, by the first driven roller at one side of the polymerization tank, the band-shaped core material can be immersed in the polymerization solution. By the first tension roller at other side, the core material can be moved in the polymerization tank while a proper tension is applied thereto. As a result, contact of the core material with the bottom of the polymerization tank at the time of moving is prevented, and an appropriate polymerization film is formed on each capacitor element.

From above at one side of the. polymerization tank toward the lower part of the first driven roller, the core material to which the conductive tape is adhered is moved in the polymerization solution in an inclined state of 30° or less. In this constitution, without peeling of the conductive tape, the core material smoothly moves in the polymerization tank. As a result, the polymerization film is formed stably on each one of the plurality of capacitor elements provided in the longitudinal direction of the band-shaped core material.

The polymerization solution flows into the polymerization tank from the upper direction than the first driven roller at one side of the polymerization tank, and the polymerization tank at one side has an inclined bottom downward to the direction of installation of the first driven roller. In this constitution, the polymerization solution flowing into the polymerization tank is a laminar flow, thereby preventing formation of waves on the polymerization solution in the polymerization tank. As a result, the polymerization film can be formed stably on each capacitor element.

From the lower part of the first tension roller at other side of the polymerization tank toward the upper side of the polymerization tank, the core material to which the conductive tape is adhered is moved out of the polymerization solution in an inclined state of 30° or less. In this constitution, peeling of the conductive tape from the core material is prevented. As a result, core material can be moved to the downstream side stably together with the conductive tape.

The polymerization solution flows out of the polymerization tank from other end side of the polymerization tank, and the polymerization tank at other end side has an inclined bottom upward to the other end side from the tension roller. In this constitution, the polymerization solution flowing out of the polymerization tank is a laminar flow, thereby preventing formation of waves on the polymerization solution in the polymerization tank. As a result, the polymerization film can be formed stably on each capacitor element.

The capacitor element manufacturing apparatus includes each first driven roller installed at one side of each polymerization tank of the plurality of polymerization tanks, and one through-shaft penetrates the central shaft of each first driven roller. In this constitution, the support structure of the plurality of first driven rollers is simplified. In addition, the position of each first driven roller in each polymerization tank is uniform. As a result, the immersing position of the core material in the polymerization solution in each polymerization tank is uniform, and formation of polymerization film on the capacitor element in each core material is stable.

The capacitor element manufacturing apparatus includes a through-shaft formed in each first driven roller, and a ball bearing installed between the first driven roller and through-shaft, and this ball bearing is placed above the liquid level of the polymerization solution. Since the bearing is provided between the first driven roller and the through-shaft, rotation of the first driven roller is smooth. Moreover, since this bearing is provided above the polymerization solution level, occurrence of defective rotation of the bearing due to sticking of polymerization solution is prevented. As a result, the first driven roller operates together with the band-shaped core material by adhering the conductive tape, so that disturbance of moving of the core material can be prevented.

The first driven roller has an outer circumference curved so that the center line portion may project in the outer circumferential direction, and the core material is moved while contacting with the center line portion. At one side of the polymerization tank, the first driven roller contacting with the band-shaped core material to which the conductive tape is adhered has a curved surface so that the center line portion of the outer circumference projects in the outer circumferential direction, so that the core material is prevented from being deviation from the position of the center line portion of the first driven roller. Accordingly, by this first driven roller, the core material can be stably guided into one side in the polymerization tank.

The capacitor element manufacturing apparatus includes each first tension roller installed at other side of each polymerization tank of the plurality of polymerization tanks, and one through-shaft penetrates the center shaft of each first tension roller, and each tension roller is driven by driving of the through-shaft. In this constitution, by driving a plurality of first tension rollers disposed in parallel by one drive shaft, the drive mechanism is simplified. Further, in each one of the polymerization tanks disposed in parallel, tension applied to the band-shaped core material is made almost uniform by the first tension roller. As a result, the moving state of the band-shaped core material in each polymerization tank is stable, and the polymerization film is formed stably.

The first tension roller has a flat outer circumference, and the core material moves while contacting with the flat outer circumference of the first tension roller. By forming the outer circumference of the first tension roller in a flat shape, the outer circumference and the band-shaped core material to which the conductive tape is adhered contact with each other in flat state so as to slide on each other. As a result, tension application by the first tension roller is stable.

The polymerization tank has temperature control means installed underneath the bottom of the polymerization tank, and the temperature control means controls the temperature of the polymerization solution. In this constitution, the polymerization reaction may be stabilized.

The specified temperature is controlled by the water controlled at the specified temperature. The polymerization tank has a constitution of passing water controlled in temperature at the specified temperature underneath the bottom of the polymerization tank. Since the water controlled in temperature at the specified temperature has a larger heat capacity as compared with gas, it is easier to stabilize the temperature of the polymerization solution in the polymerization tank at the specified temperature. As a result, the polymerization reaction is stabilized.

The polymerization tank has a spacer projecting into the polymerization solution so as to separate from the upper surface of the polymerization solution. If the volume of the polymerization solution is decreased, the liquid level can be heightened by projecting the spacer. Therefore, the distance between the negative electrode and the core material can be extended. As a result, bubbles formed in the negative electrode hardly stick to the band-shaped core material portion. Hence, the polymerization film is formed stably in the cathode lead-out portion of the capacitor element of the band-shaped core material.

The polymerization tank has a lid installed in the opening of the upper surface, and a spacer installed at the lower side of the lid, and at least a part of the spacer is projecting into the polymerization solution. By disposing the lid on the upper opening of the polymerization tank, and disposing the spacer at the lower side of this lid and projecting into the polymerization tank, the evaporation space of the upper surface of the polymerization solution and the surface exposed area of the polymerization solution are decreased. As a result, the evaporation of the polymerization solution decreases, and the economy is improved.

The step of immersing the core material to which the conductive tape is adhered in the polymerization solution includes a step of moving the core material to which the conductive tape is adhered from one side to other side of the polymerization tank through the lower side of the spacer. By moving the core material to which the conductive tape is adhered in the lower pat of the polymerization tank underneath the spacer, the oligomer formed at the time of forming the polymerization film settles in the lower cored material portion. As a result, the forming efficiency of polymerization film is enhanced.

The spacer has a lower part of a slope inclined upward. Since the lower part of the spacer is an upward slope, bubbles formed in the negative electrode can be moved upward. Therefore, the polymerization film forming efficiency is enhanced in the capacitor element of the band-shaped core material moving underneath.

The negative electrode is disposed above the lower end of the spacer, and the step of applying voltage to the conductive tape includes a step of applying a voltage between the conductive tape and negative electrode. In this constitution, bubbles formed in the negative electrode hardly stay at the lower end of the spacer. As a result, the polymerization film forming efficiency is enhanced in the capacitor element of the band-shaped core material moving underneath.

The spacer is made of vinyl chloride. By forming the spacer of vinyl chloride, degeneration of spacer and resulting degeneration of polymerization solution can be prevented. As a result, the polymerization film is formed stably on the capacitor element of the band-shaped core material.

The negative electrode has a lower part in a shape inclined upward. By guiding the bubbles formed in the negative electrode upward, it prevents drop of polymerization film forming efficiency due to move of bubbles downward to the capacitor element of the band-shaped core material.

The polymerization tank has an upper space and a lower space, the lower space has a smaller sectional area than the upper space, the spacer and the negative electrode are disposed on the upper space, and the core material passes through the lower space. By defining the sectional area of the core material moving portion in the lower part of the polymerization tank smaller than the sectional area of the spacer negative electrode storage part located above, disturbance of the polymerization solution occurring in the upper spacer and the negative electrode storage part is prevented from affecting the core material moving part underneath. As a result, in the core material moving part, the polymerization film is formed stably on the capacitor element.

The conductive tape is adhered only to the upper side of the core material. Since the conductive tape is adhered to the upper side of the core material in at the upper side of the negative electrode, the polymerization film can be formed easily from the upper surface of this conductive tape. Consequently, the polymerization film is formed so as to grow from the conductive tape and the cathode lead-out portion surface of the capacitor element to the back side. Since conductive tape is not disposed at the lower side of the core material, the productivity is higher by the corresponding portion.

The polymerization tank has an immersion region in the core material is immersed in the polymerization solution, and a weir installed on the liquid level between the immersing region and the first driven roller. In this constitution, bubbles formed in the negative electrode are prevented from sticking to the core material by floating up to the liquid level of the polymerization solution. As a result, interference of polymerization in subsequent process is prevented. That is, by setting up the weir, move of bubbles floating to the liquid level into the direction of core material is blocked, and sticking to the core material and the resulting formation of defective polymerization film can be prevented.

The negative electrode has a plurality of negative electrodes disposed in the longitudinal direction. In this constitution, the potential difference between the parts of the conductive tape in the longitudinal direction of the conductive tape adhered to the band-shaped core material and the negative electrodes can be maintained within a specified range. As a result, the polymerization film is substantially formed uniformly on the capacitor elements at each position of the band-shaped core material.

Each negative electrode of the plurality of negative electrodes is disposed at a specified interval, and the voltage applied to each negative electrode is individually different. By spacing the negative electrodes at a specified interval, bubbles formed in each negative electrode are prevented from staying in the adjacent negative electrodes. Hence, blocking of polymerization reaction in the bubble staying area can be prevented. As a result, the polymerization film of each capacitor element can be formed stably.

The negative electrode is made of at least one of stainless steel and nickel. By forming the negative electrode of stainless steel or nickel, deterioration of negative electrode is prevented in spite of polymerization reaction. As a result, the polymerization film can be formed stably for a long period on the capacitor element at each position of the band-shaped core material.

The capacitor element manufacturing apparatus includes first voltage applying means installed at one side of the polymerization tank and second voltage applying means installed at other side, and each one of the first voltage applying means and second voltage applying means applies a voltage to the conductive tape. By applying voltages to one side and other side of the polymerization tank of the conductive tape, drastic potential fluctuation in the longitudinal direction of the conductive tape can be suppressed. As a result, the polymerization reaction on the plurality of capacitor elements provided in the longitudinal direction of the band-shaped core material is stabilized.

The capacitor element manufacturing apparatus includes a first current feed roller installed at one side of the polymerization tank, and the first current feed roller has an action of adhering the conductive tape to the core material, an action of pressing the conductive tape to the core material, and an action of applying a voltage to the conductive tape. By composing first voltage applying means of the first current feed roller for pressing the conductive tape to the core material, the constitution is simplified. Further, the first current feed roller presses the conductive tape to the core material, so that it is pressed to the conductive tape. As a result, the voltage application to the conductive tape is stabilized, and the polymerization film is stably formed on the capacitor element.

The capacitor element manufacturing apparatus includes a dust collecting squeegee abutting against the outer circumference of the first current feed roller, and the deposits adhering to the outer circumference of the first current feed roller are removed by the dust collecting squeegee. As the dust collecting squeegee abuts against the outer circumference of the first current feed roller, dust and foreign deposits can be removed from the outer circumference of the first current feed roller. As a result, the voltage can be applied stably from the first current feed roller to the conductive tape, and the polymerization film is formed stably on the capacitor element.

The capacitor element manufacturing apparatus includes a second driven roller installed at the upstream side of the first current feed roller, and the second driven roller has an outer circumference projecting in the outer circumferential direction in the center line portion, and the core material is supplied in the direction of the first current feed roller through the second driven roller. In this constitution, deviation of band-shaped core material is corrected by the second driven roller. Hence, the band-shaped core material moves without shifting in the direction of the first current feed roller. As a result, the conductive tape is adhered by the first current feed roller and the voltage is applied stably.

The capacitor element manufacturing apparatus has a reel installed at the upstream side of the first current feed roller, the reel coils the conductive tape in a laminated state through a separator, and the separator is peeled from the conductive tape between the reel and the first current feed roller. Since the conductive tape is coiled on the reel in the laminated state with the separator, the conductive tape being let off from the reel is not curled even after the separator is peeled. As a result, it is stable when supplying into the first current feed roller at the downstream side, and adhering to the band-shaped core material.

The capacitor element manufacturing apparatus has a second tension roller installed between the reel and the first current feed roller, and the second tension roller grips a laminated body of the conductive tape and separator, and the separator is peeled from the conductive tape at the downstream side of the second tension roller. That is, a second tension roller is provided between the reel and the first current feed roller, and this second tension roller grips the laminated body of the conductive tape and separator, and the tension is applied outside of one side of the polymerization tank. In this constitution, sine the conductive tape and the separator forms a laminated body, the strength of the laminated body is increased. As a result, a sufficient tension can be applied.

The capacitor element manufacturing apparatus includes a position defining plate disposed at both sides of the second tension roller, and the position defining plate defines the position of the conductive tape. By disposing the position defining plate at both sides of the second tension roller, deviation of the laminated body of the conductive tape and separator at the second tension roller is prevented. Hence, a required tension is stably added by the second tension roller.

The conductive tape is made of at least one of stainless steel and nickel. In this constitution, when performing polymerization reaction by applying a voltage to this conductive tape, this conductive tape is prevented from eluting into the polymerization solution. As a result, by using the conductive tape, polymerization reaction is done stably.

The step of applying a voltage includes a step of applying a voltage from the voltage application terminal to the core material by setting the voltage application terminal in contact with the anode lead-out portion of the core material at the upstream side of the first current feed roller, and the applied voltage is a voltage between the energization voltage by the first current feed roller and the energization voltage by the negative electrode, and is same or higher than the voltage in the portion of the conductive tape immersed in the polymerization solution. In this constitution, the load voltage of the capacitor terminal formed in the hand-shaped core material can be suppressed lower than the withstand voltage. As a result, breakage of the capacitor element can be prevented.

The formation film of the core material has an aluminum oxide film, and the voltage application terminal is made of stainless steel. The voltage application terminal can easily break down the aluminum oxide film. Accordingly, stable energization is possible. Further, since the voltage application terminal is made of stainless steel, the weather resistance is enhanced. Further, if the rigid aluminum oxide film is rubbed by the terminal made of stainless steel, the stainless steel surface is also scarred, and the surface is exposed. As a result, voltage is applied stably from the voltage application terminal to the core material.

The capacitor element manufacturing apparatus includes a peeling roller installed outside of the polymerization solution in the polymerization tank at the downstream side of the first tension roller, and this peeling roller peels off the conductive tape in the orthogonal direction from the core material. In this constitution, without causing fluctuations, the conductive tape can be smoothly peeled from the core material. As a result, the conductive tape and core material can be smoothly moved to the downstream side.

The capacitor element manufacturing apparatus includes a cracking roller installed in the running path of the conductive tape at the downstream side of the peeling roller, and this cracking roller has a smaller diameter than the peeling roller, and the cracking roller bends the running path of the conductive tape in the orthogonal direction. In this constitution, it is easy to form cracks in the polymerization film on the conductive tape. Accordingly, it is easy in the process of removing the polymerization film from the conductive tape in the subsequent steps.

The running path of the conductive tape between the peeling roller and the cracking roller has a dry space of the polymerization film formed on the surface of the conductive tape. In this constitution, it is easy to form cracks in the polymerization film on the conductive tape. Hence, the removing job is easier in the subsequent steps.

The capacitor element manufacturing apparatus includes a first peeling pawl installed at the downstream side of the cracking roller, and the first peeling pawl contacts with the surface of the conductive tape bent by the cracking roller. In this constitution, the cracked polymerization film is easily removed by the first peeling pawl.

The capacitor element manufacturing apparatus includes a second peeling pawl installed at the downstream side of the first peeling pawl, and the second peeling pawl contacts with the upper surface of the conductive tape. As the second peeling pawl contacts with the upper surface of the conductive tape at the downstream of the first peeling pawl, the slight polymerization film not removed by the first peeling pawl can be easily removed by this second peeling pawl. Hence, in the subsequent process, the voltage is applied stably from the upper surface of the conductive tape.

At least one of the first peeling pawl and second peeling pawl has a leading end branched into a plurality. In this constitution, the removing effect of the polymerization film at the leading end is enhanced.

The capacitor element manufacturing apparatus includes a roller disposed at the lower side of the conductive tape of at least one of the first peeling pawl and second peeling pawl. In this constitution, the first peeling pawl or second peeling pawl may be strongly pressed to the upper side of the conductive tape. Hence, the peeling effect of the polymerization film may be enhanced.

The capacitor element manufacturing apparatus includes suction means installed on the first peeling pawl. Since a large amount of polymerization film is removed in the first peeling pawl area, by sucking the removed polymerization film by the suction means, it is effective to prevent the removed polymerization film from sticking again to the upstream or downstream side. As a result, occurrence of various problems can be prevented.

The capacitor element manufacturing apparatus includes a second current feed roller installed at the downstream side of the first peeling pawl. As the second current feed roller is installed as second voltage applying means on the upper surface of the conductive tape from which the polymerization film is removed, it enhances the polymerization film forming efficiency by applying a voltage from one side and other side of the polymerization tank of the conductive tape.

The capacitor element manufacturing apparatus includes a second current feed roller as second voltage applying means installed at the downstream side of the second peeling pawl. At the downstream side of the second peeling pawl, by installing the second current feed roller as second voltage applying means on the upper surface of the conductive tape from which the polymerization film is cleanly removed, it enhances the polymerization film forming efficiency by applying a voltage from one side and other side of the polymerization tank of the conductive tape.

The capacitor element manufacturing apparatus includes a tension roller installed on the running path of the conductive tape at the downstream side of the peeling roller. The tension roller pulls the conductive tape. By pulling the conductive tape by this tension roller, the band-shaped core material can be removed from one side to other side of the polymerization tank. By applying this tension force to the conductive tape only by the tension roller, breakage of core material by pulling the band-shaped core material can be prevented.

The capacitor element manufacturing apparatus includes a tension roller installed at the downstream side of the second current feed roller. In this constitution, a tension is applied also to the conductive tape when the second current feed roller is passing. Accordingly, it prevents formation of gap between the second current feed roller and conductive tape. As a result, the current is fed stably from the second current feed roller and the conductive tape.

The capacitor element manufacturing apparatus includes a take-up reel installed at the downstream side of the tension roller, and the take-up reel takes up the conductive tape. In this constitution, the conductive tape is taken up smoothly in the subsequent process. As a result, it is effective to prevent occurrence of malfunction due to entangling of the conductive tape or the like.

The conductive substance has a manganese dioxide layer. In this constitution, formation of conductive substance is extremely easy. Further, a conductive film having an excellent conductive property can be formed easily.

The step of forming the conductive substance includes a step of applying an aqueous solution of manganese nitrate on the formation film, and a step of forming a manganese dioxide layer by pyrolysis of the applied aqueous solution of manganese nitrate. In this constitution, the manganese dioxide layer as a conductive layer can be formed easily.

The polymerization solution contains at least one monomer selected from the group consisting of pyrrole, thiophene, furan and their derivatives. The step of forming the polymerization film includes a step of for polymerizing at least one monomer electrolytically. In this constitution, an adequate polymerization film can be formed on the capacitor element by polymerization reaction.

The polymerization solution is a mixed polymerization solution of a first polymerization solution and a second polymerization solution flowing out from other side of the polymerization tank. That is, the polymerization solution supplied from one side of the polymerization tank into this polymerization tank is mixed with the polymerization solution flowing out of the polymerization tank from other side of the polymerization tank. In the polymerization solution flowing out of the tank from the other side of the polymerization tank, oligomer is formed by polymerization reaction. This polymerization containing oligomer flows into the tank from one side of the polymerization tank, and mixed into the polymerization solution, so that the polymerization film is efficiently formed on each capacitor element in the polymerization tank.

Referring now to the drawings, a manufacturing method of solid electrolytic capacitor in exemplary embodiments of the invention and its manufacturing method are described below.

Exemplary Embodiment 1

Figure 2:
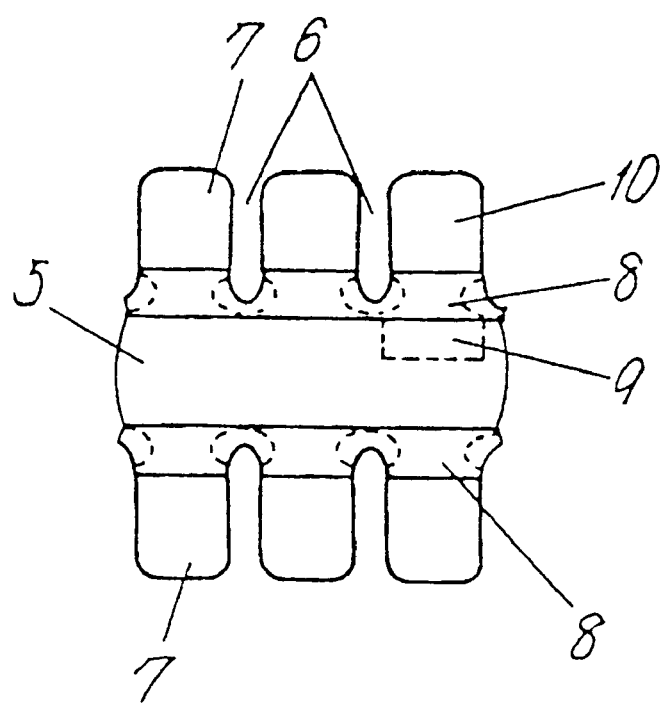
FIG. 2 is a plan of one manufacturing state of capacitor element used in the manufacturing method of solid electrolytic capacitor in the embodiment of the invention.

FIG. 1 is a conceptual diagram of a manufacturing apparatus of solid electrolytic capacitor in an embodiment of the invention. FIG. 2 shows the state of forming a plurality of capacitor elements 7 at both sides by cutting and forming slits 6 at specified intervals at both sides of a band-shaped core material 5.

First, the core material 5 having a plurality of capacitor elements was supplied by a supplying device 71. As the core material 5, an aluminum foil (thickness: 100 μm) was used. The face and back surfaces of the aluminum foil were roughened electrochemically. An anodic formation film is formed on the face and back surfaces of the aluminum foil. Forming treatment was executed by applying a voltage of 35 V. By adhering an insulating film 8 on the face and back surface of the aluminum foil having a formation film, it was separated into an anode lead-out portion 9 and a cathode lead-out portion 10. The size of the cathode lead-out portion 10 is 3 mm×4 mm.

Consequently, a formation film was formed by a formation film forming device 72. That is, on the surface of the aluminum foil 5 having slits 6 shown in FIG. 2, an anodic oxidation film was formed as a formation film by performing a formation treatment in a tank 11 (forming treatment step 12 in FIG. 1).

In succession, a conductive substance layer was formed by a conductive substance forming device 75. That is, an aqueous solution of manganese nitrate in a polymerization tank 13 was applied on the cathode lead-out portion 10. Later, pyrolysis was performed in a furnace 14 for 5 minutes at 300° C. In this process, a manganese dioxide layer was formed on the cathode lead-out portion 10 as a conductive substance layer (conductive substance forming step 15 in FIG. 1).

Figure 3:
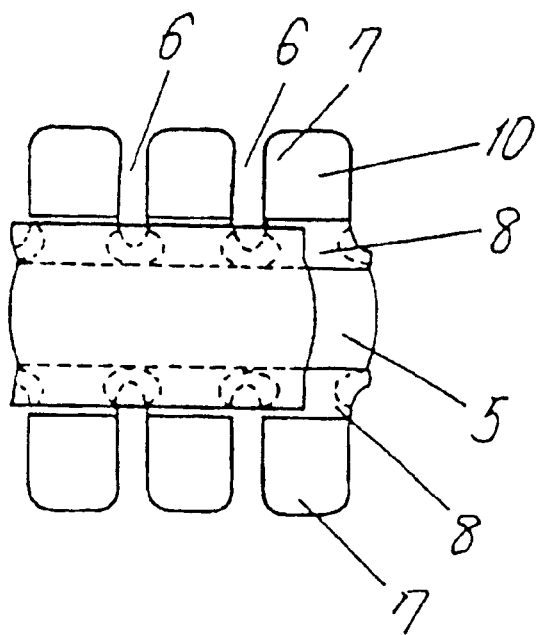
FIG. 3 is a plan of other manufacturing state of capacitor element used in the manufacturing method of solid electrolytic capacitor in the embodiment of the invention.
Figure 4:
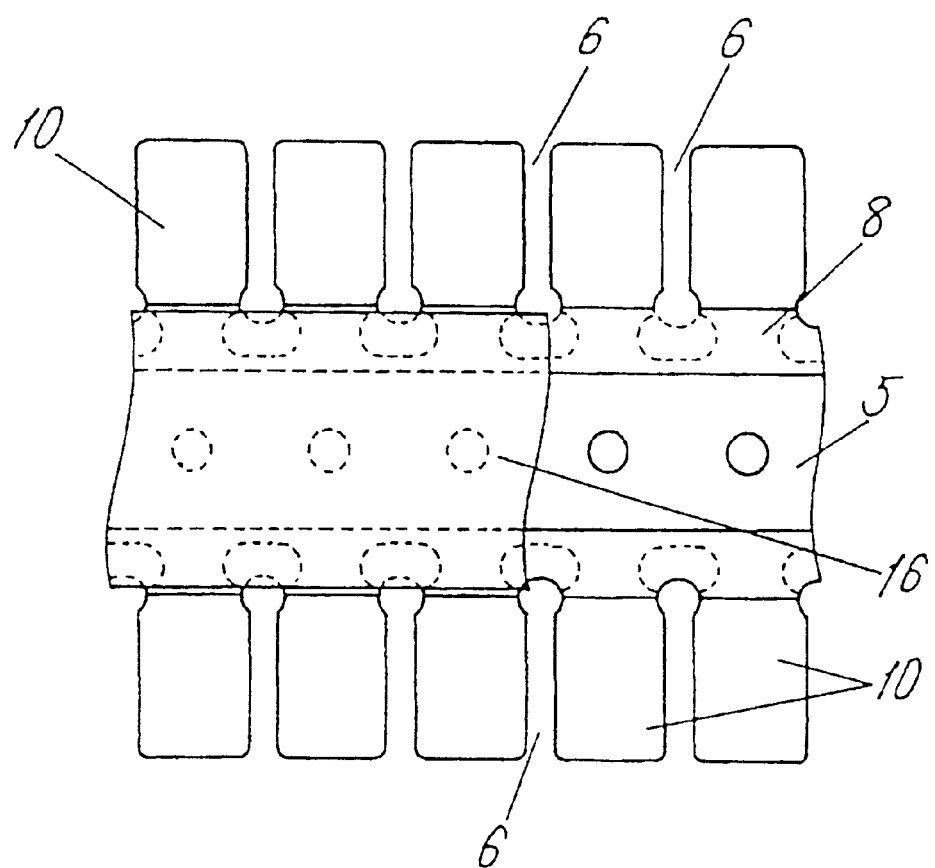
FIG. 4 is a plan of a different manufacturing state of capacitor element used in the manufacturing method of solid electrolytic capacitor in the embodiment of the invention.
Figure 5:
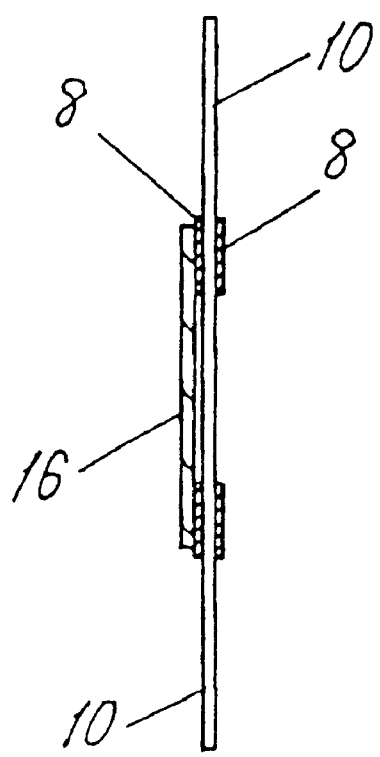
FIG. 5 is a sectional view of one manufacturing state of capacitor element used in the manufacturing method of solid electrolytic capacitor in the embodiment of the invention.

Then, as shown in FIG. 3, FIG. 4, and FIG. 5, the conductive tape was adhered by an adhering device 76. That is, the conductive tape 16 was adhered on an insulating tape 8 at both sides of the core material 5 forming the manganese dioxide layer. The conductive tape 16 has a role as a polymerization electrode for forming an electrolytic polymerization layer. The conductive tape 16 has a role as a positive electrode when polymerizing.

Next, a polymerization film was formed by a polymerization device 70. That is, the core material 5 to which the conductive tape 16 is adhered is sequentially immersed in the polymerization solution 18 in the polymerization tank 17, and is moved in the polymerization tank 17. The polymerization solution 18 is an aqueous solution containing 0.2 mol/liter of pyrrole and 0.1 mol/liter of alkyl naphthalene sulfonate. As four independent cathodes 19, four stainless steel plates are disposed beneath the liquid level in the polymerization tank 17. A voltage is applied between the conductive tape 16 as a common positive electrode and four independent negative electrodes 19. By application of the voltage, polymerization started from the conductive tape 16, and a polymerization film of conductive high polymer was formed on the entire cathode lead-out portion 10 of the face and back surfaces in about 30 minutes from entering and leaving the polymerization tank 17 (polymerization film forming step 20 in FIG. 1).

Finally, the conductive tape 16 was peeled off by a peeling device 79. That is, after being taken out from the polymerization solution 18, the conductive tape 16 was peeled from the aluminum foil forming the conductive high polymer film.

In this way, a series of process from forming treatment till polymerization was carried out continuously as shown in FIG. 1. At this time, the series of process was done with particular care given so that the conveying rollers might not contact with the cathode lead-out portion 10.

Moreover, after formation of the polymerization film of conductive high polymer, a carbon paint layer and silver paint layer were formed on the surface of this conductive high polymer film. Further, cutting individually so as to have the anode lead-out portion 9 and cathode lead-out portion 10 as indicated by broken line in FIG. 2, one capacitor element was fabricated. Taking out the cathode lead from the cathode lead-out portion 10, and taking out the anode lead from the anode lead-out portion 9, the capacitor element was covered with an external epoxy resin. Thus, a solid electrolytic capacitor was completed.

In thus fabricated solid electrolytic capacitor, the initial characteristics were measured. Table 1 shows the results of measurement, that is, electrostatic capacity of solid electrolytic capacitor, tangent of loss angle, leak current (10 V applied, 2 minutes), and withstand voltage (product breakdown voltage by raising voltage at a rate of 0.2 V/1 sec).

Exemplary Embodiment 2

Similar to exemplary embodiment 1, a solid electrolytic capacitor was fabricated in the following manner.

The cathode lead-out portion 10 measures 2 mm×2 mm. At the time of electrolytic polymerization, the conductive tape 16 which is the polymerization electrode was used as the positive electrode, and a single stainless steel was used as the cathode 19. A voltage was applied between the positive electrode and the cathode. At this time, a polymerization film of conductive high polymer was formed on the entire cathode lead-out portion 10 in about 10 minutes. The other manufacturing method is same as in exemplary embodiment 1. Thus, a solid electrolytic capacitor was fabricated. The initial characteristics of the obtained solid electrolytic capacitor are shown in Table 1.

COMPARATIVE EXAMPLE 1

A conductor layer was placed on an aluminum foil having an oxide layer, being roughened and slotted in the surface. As the conductor layer, a chemical oxidation polymerization conductive high polymer film of pyrrole was placed. Ammonium persulfate was used as the oxidizing agent in the chemical oxidation polymerization. Thus, a plurality of capacitor elements were formed.

Figure 22:
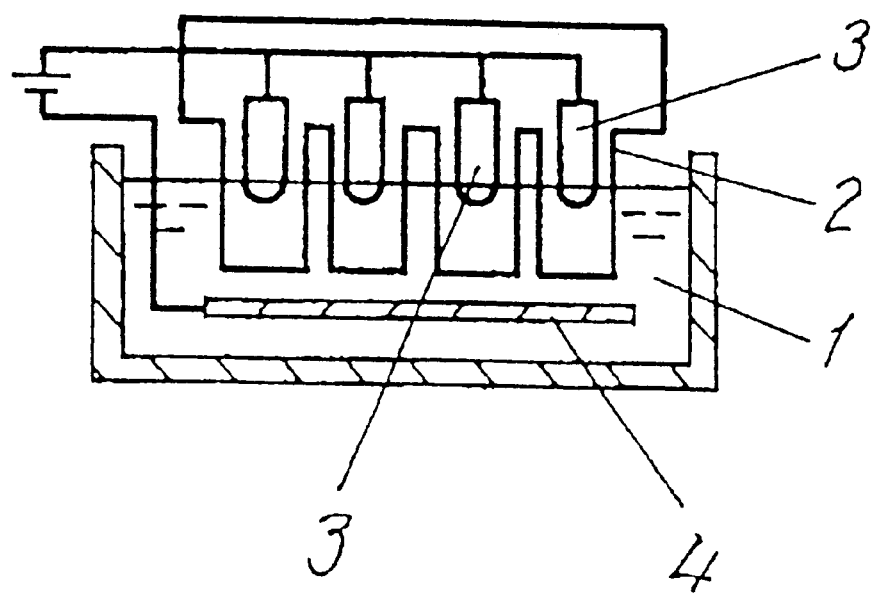
FIG. 22 is a sectional view of a polymerization tank for forming a polymerization film in a conventional manufacturing method of solid electrolytic capacitor.

Later, as shown in FIG. 22, each anode lead-out portion and each cathode lead-out portion of individual elements were brought into contact with the electrode 3, and electrolytic polymerization was performed on the chemical oxidation polymerization conductive high polymer film. In this way, the conductive high polymer film was formed on the conductor layer. In this manner, a solid electrolytic capacitor of comparative example was prepared. The initial characteristics of the solid electrolytic capacitor of the comparative example are shown in Table 1.

TABLE 1

|  | Electrostatic capacity ($\mu$F) | Tangent of loss angle (%) | Leak current ($\mu$A) | Withstand voltage (V) |
| --- | --- | --- | --- | --- |
| Exemplary embodiment 1 | 3.42 | 1.2 | 0.02 | 23.1 |
| Exemplary embodiment 2 | 1.08 | 1.1 | 0.01 | 22.6 |
| Comparative example | 3.54 | 1.6 | 2.4 | 16.0 |

Rating:
Exemplary embodiment 1: 10 V, 3.3 $\mu$F
Exemplary embodiment 2: 10 V, 1.1 $\mu$F
Exemplary embodiment 3: 10 V, 3.3 $\mu$F As clear from the table, the solid electrolytic capacitors of the embodiments have a small leak current and a high withstand voltage. Further, by using the conductive tape 16 as the polymerization starting electrode, electrolytic polymerization is done efficiently, and the conductive high polymer film can be formed efficiently on a plurality of negative electrodes. Moreover, since the plurality of capacitor elements 7 are formed on the band-shaped core material, the electrolytic polymerization is performed continuously. As a result, as compared with the comparative example, the productivity is notably enhanced.

Instead of the aluminum foil used as the core material 5, meanwhile, tantalum, titanium or other metal may be used. The shape and size of the core material are not limited to the embodiments, and arbitrary shape and size may be used.

Figure 6:
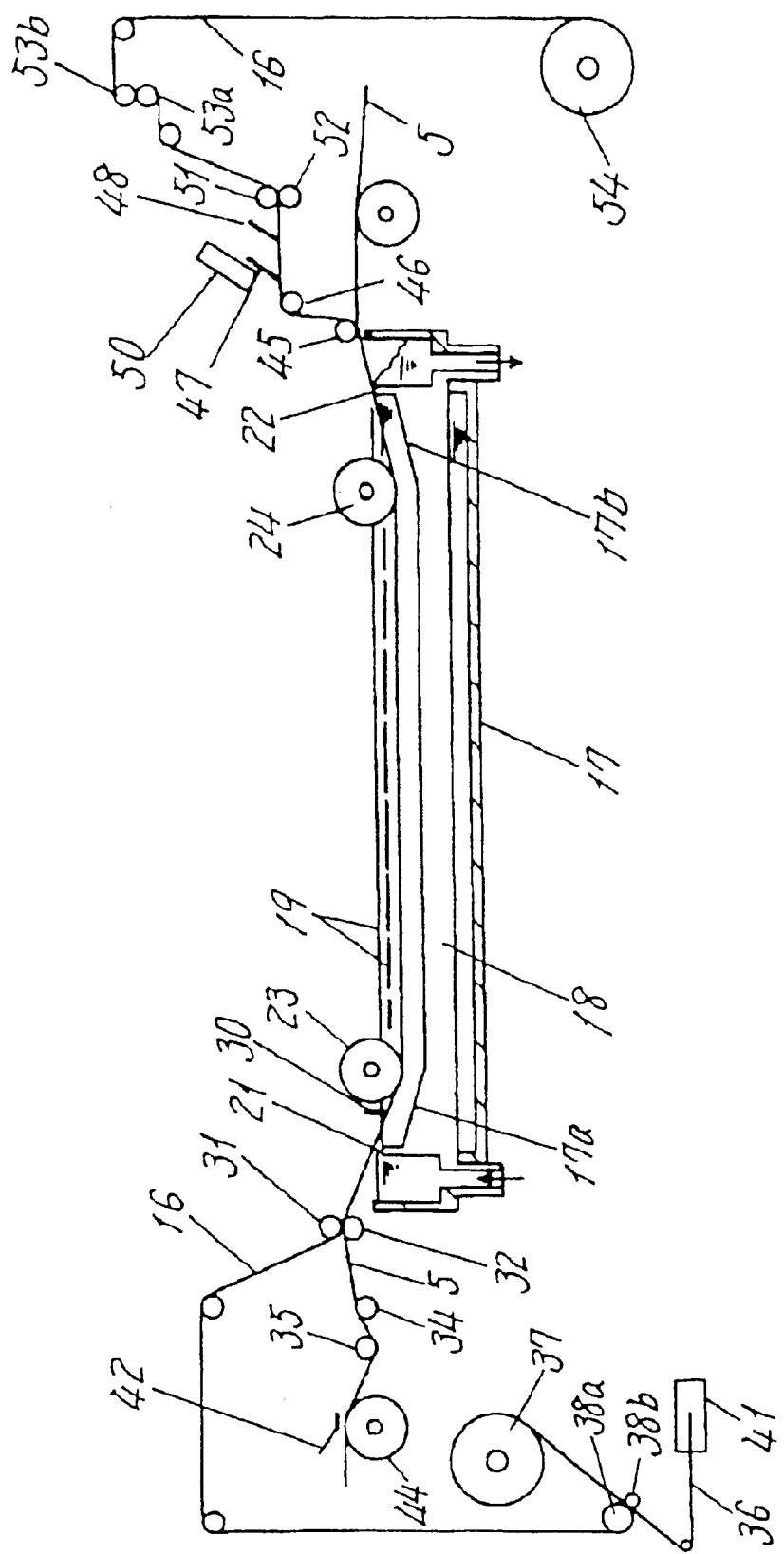
FIG. 6 is a sectional view of a polymerization tank for forming a polymerization film in the manufacturing method of solid electrolytic capacitor in the embodiment of the invention.
Figure 7:
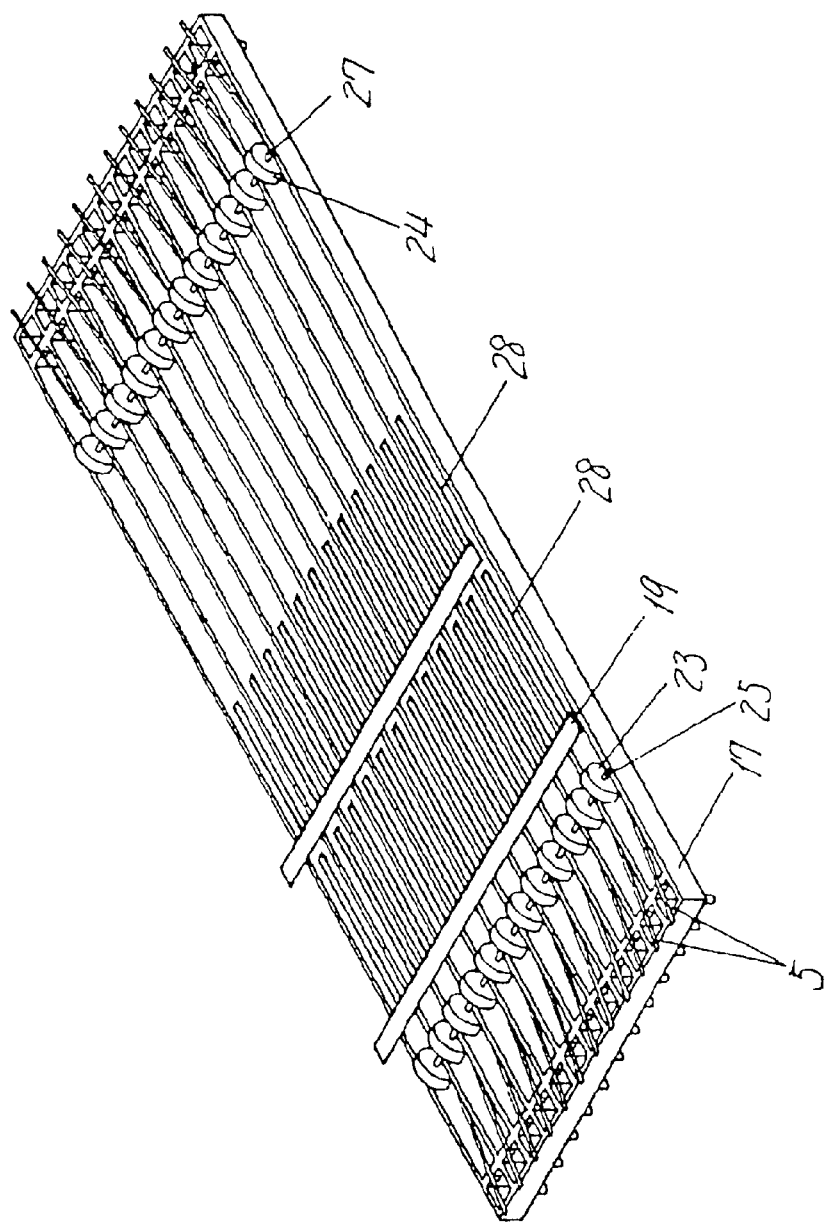
FIG. 7 is a perspective view of the polymerization tank for forming a polymerization film in the manufacturing method of solid electrolytic capacitor in the embodiment of the invention.
Figure 8:
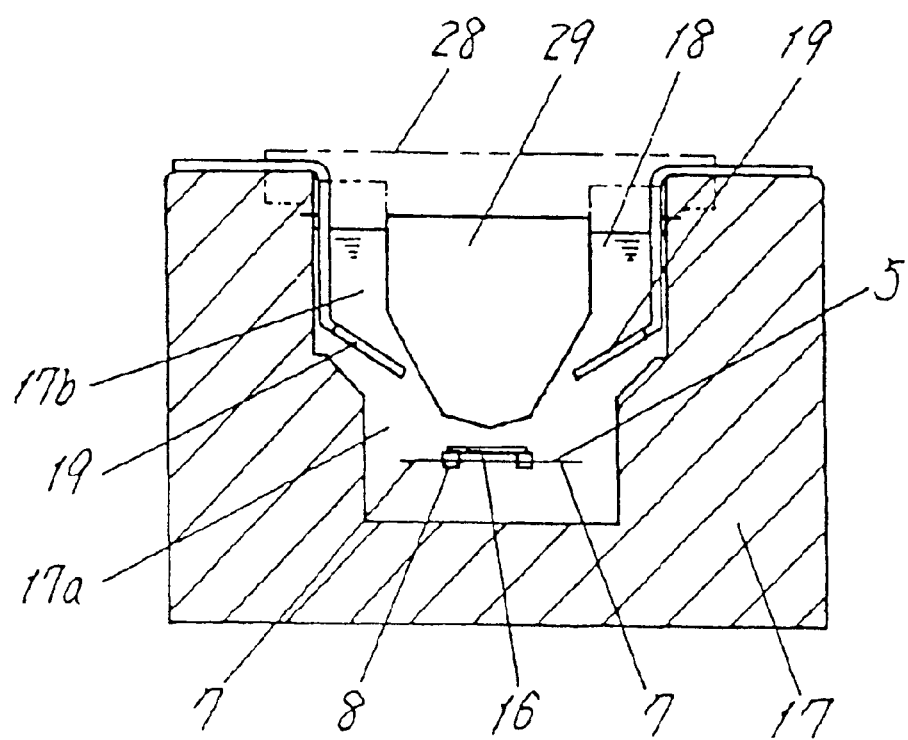
FIG. 8 is a sectional view of the polymerization tank for forming a polymerization film in the manufacturing method of solid electrolytic capacitor in the embodiment of the invention.

FIG. 6, FIG. 7, and FIG. 8 show the detail of the constitution of the polymerization film forming step 20 in FIG. 1.

The polymerization film forming device at the polymerization film forming step 20 includes a polymerization tank 17, a polymerization solution 18 contained in this polymerization tank 17, and a negative electrode 19 installed in the polymerization solution 18 in the polymerization tank 17. This polymerization film forming step 20 includes a step forming a formation film on the surface of the core material 5, and a step of forming a polymerization film on the surface of the cathode lead-out portion 10 of the capacitor element 7, by applying a voltage to the conductive tape 16, while immersing in the polymerization solution 18, with each anode lead-out portion 9 of the plurality of capacitor elements 7 containing the conductive substance adhered to the conductive tape 16.

In this process, since the anode lead-out portion 9 of the plurality of capacitor elements 7 is adhered to the conductive tape 16, by applying a voltage between the conductive tape 16 and the negative electrode 19, the polymerization starting from the surface of the conductive tape 16 spreads to each cathode lead-out portion 10 of each capacitor element 7, so that a polymerization film is formed on the cathode lead-out portion 10 of each capacitor element 7. Thus, the productivity is notably enhanced.

In this exemplary embodiment, as shown in FIG. 4, a plurality of capacitor elements 7 are integrally projected and formed in the direction orthogonal to the longitudinal direction of the core material 5, at both sides in the longitudinal direction of the band-shaped core material 5. Accordingly, at the time of forming polymerization film, the plurality of capacitor elements 7 can be handled as one body, and hence the productivity is improved.

These capacitor elements 7 can be formed easily by forming slits 6 in the direction orthogonal to the core material 5, at specified intervals as shown in FIG. 4, in the longitudinal direction of the band-shaped core material 5.

Further, as shown in FIG. 2, the projecting root of the capacitor element 7 projecting in the direction orthogonal to the both sides in the longitudinal direction of the band-shaped core material 5 is the anode lead-out portion 9, and the conductive tape 16 is adhered to this surface of the anode lead-out portion 9. The projecting root side of each capacitor element 7 at both sides of the core material 5 is the anode lead-out portion 9, and its projecting root side is the central part of the core material 5, and one conductive tape 16 is adhered to the central part of the core material 5. In this method, the distance between the cathode lead-out portion 10 of each capacitor element 7 and the conductive tape 16 at both sides of the core material 5 is stable. As a result, a homogeneous polymerization film can be formed on the cathode lead-out portion 10 of each capacitor element 7.

As shown in FIG. 4 and FIG. 5, in the region of the core material 5 corresponding to both sides in the longitudinal direction of the conductive tape 16, a long insulating tape 8 is adhered. The insulating tape 8 has a higher flatness than the surface of the core material 5. The conductive tape 16 is adhered to the insulating tape 8. In this constitution, the following effects are obtained. That is, since the surface of the insulating tape 8 has a higher flatness than the core material 5 forming the formation film, it is easier to adhere the conductive tape 16. Further, in a later process, it is easy to peel off the conductive tape 16. As a result, the productivity is heightened. Moreover, by the insulating tape 8, the anode lead-out portion 9 and cathode lead-out portion of each capacitor element 7 are separated, and when forming the electrolytic polymerization film, invasion of the polymerization film into the anode lead-out portion 9 side can be prevented.

As shown in FIG. 6 and FIG. 7, the polymerization tank 17 may be composed also as shown in FIG. 6 and FIG. 7. That is, the polymerization tank 17 has a long shape, and a plurality of long polymerization tanks are disposed. The productivity is further increased by immersing the band-shaped core material 5 to which the conductive tape 16 is adhered, in the polymerization solution 18 in each polymerization tank of the plurality of polymerization tanks.

By the long shape of each polymerization tank, the volume of the polymerization solution 18 can be decreased.

Also as shown in FIG. 6 and FIG. 7, in an alternative method, the band-shaped core material 5 to which the conductive tape 16 is adhered is put in the polymerization solution 18 at one side of the long polymerization tank 17, and the band-shaped core material 5 is moved so as to go out of the polymerization solution 18 at other side of the polymerization tank 17. In this method, as the conductive high polymer film, the polymerization film can be continuously and sequentially formed on the cathode lead-out portion 10 of each capacitor element 7, from one side to other side in the polymerization tank 17. Further, the core material on which the polymerization film is formed is drawn out of the polymerization tank 17, and can be moved to the next step. Accordingly, the productivity is further enhanced.

In other method, the polymerization solution 18 may be allowed to flow into the polymerization tank 17 from a first overflow 21 at one side of the polymerization tank 17, and flow out of the polymerization tank 17 from a second overflow 22 at other side of the polymerization tank 17. Thus, as the polymerization solution 18 flows in and out sequentially in the polymerization tank 17, drop of concentration of the polymerization solution 18 in the polymerization tank 17 is suppressed, and the polymerization film is formed stably.

In this case, preferably, the speed of the polymerization solution 18 moving from one side to other side of the polymerization tank 17 should be nearly same as the speed of the core material 5. In this method, the relative position of each capacitor element 7 of the core material 5 and the polymerization solution 18 contacting therewith is almost constant. The relative state of the both is stagnant, not moving, so that the polymerization film may be formed stably. Hence, it is easier to form the polymerization film on the cathode lead-out portion 10 of each capacitor element 7.

At least in the lower part of the polymerization solution 18 at one side of the polymerization tank 17, an immersed first driven roller 23 is disposed. At least in the lower part of the polymerization solution 18 at other side of the polymerization tank 17, an immersed first tension roller 24 is disposed. The band-shaped core material 5 to which the conductive tape 16 is adhered is brought into contact with the lower part of the first driven roller 23 and first tension roller 24, and is moved from one side to other side of the polymerization tank 17. That is, by the first driven roller 23 at one side of the polymerization tank 17, the band-shaped core material 5 is put into the polymerization solution 18, and by the first tension roller 24 at the other side, a proper tension is applied to the core material 5, and it is moved in this state in the polymerization tank 17. As a result, an appropriate polymerization film may be formed on each capacitor element 7.

As shown in FIG. 6, from above at one side of the polymerization tank 17 toward the lower part of the first driven roller 23, the core material 5 to which the conductive tape 16 is adhered is moved in the polymerization solution 18 in an inclined state of 30° or less. In this method, the conductive tape 16 smoothly moves into the polymerization solution 18 without peeling from the core material 5. As a result, the polymerization film is formed stably on the plurality of capacitor elements 7 provided in the longitudinal direction of the band-shaped core material 5.

Also from the first driven roller 23 of the polymerization tank 17, the polymerization solution flows into the polymerization tank 17 through the overflow 21 at one side. The bottom 17a of the polymerization tank 17 at one side has a slope inclined downward to the first driven roller 23 side. In this constitution, the polymerization solution 18 flowing into the polymerization tank 17 is a laminar flow, thereby preventing formation of waves on the polymerization solution 18 in the polymerization tank 17. As a result, the polymerization film is formed stably on each capacitor element 7.

From the lower part of the first tension roller 24 at other side of the polymerization tank 17 to above the polymerization tank 17, the core material 5 to which the conductive tape 16 is adhered is moved out of the polymerization solution 18 at an inclination of 30° or less. In this constitution, the conductive tape 16 is prevented from being peeled from the core material 5. As a result, together with the conductive tape 16, the core material 5 can be stably moved to the downstream side.

Also from the first tension roller 24 at other side of the polymerization tank 17, the polymerization solution 18 is designed to flow out of the polymerization tank 17 from the overflow 22 at other side. The bottom 17b of the polymerization tank 17 at other end side has a slope inclined upward to the other end side of the polymerization tank 17 from the first tension roller 24. Accordingly, the polymerization solution flowing out of the polymerization tank 17 is a laminar flow, and hence formation of waves on the polymerization solution 18 in the polymerization tank 17 can be prevented. As a result, a polymerization film is formed stably on each capacitor element 7.

As shown in FIG. 7, each first driven roller 23 is disposed at one side of each polymerization tank 17 of the plurality of polymerization tanks 17 disposed in parallel. One through-shaft 25 penetrates the center shaft of the plurality of driven rollers 23. It hence simplifies the support structure of the plurality of first driven rollers 23. Moreover, the position of the driven rollers 23 in each polymerization tank 17 is uniform. Accordingly, the immersion position of the core material 5 into the polymerization solution 18 in each polymerization tank 17 is uniform. As a result, a polymerization film is formed stably in each capacitor element 7 of each core material 5.

Figure 11:
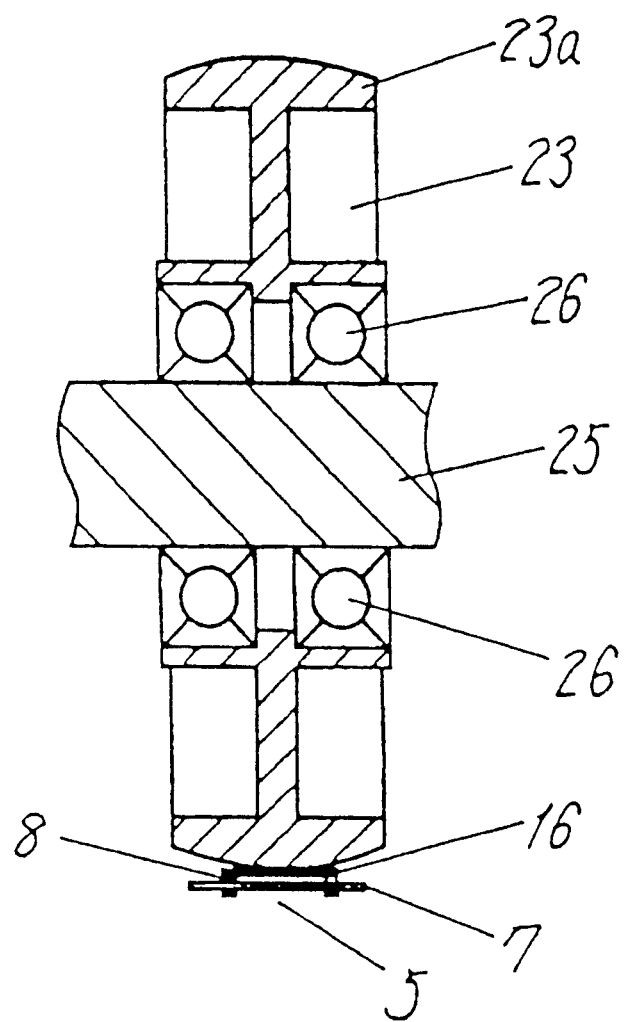
FIG. 11 is a sectional view of a first driven roller used in the polymerization tank for forming a polymerization film in the manufacturing method of solid electrolytic capacitor in the embodiment of the invention.

As shown in FIG. 11, the plurality of first driven rollers 23 have a plurality of ball bearings 26 installed between the through-shaft 25 and first driven rollers 23. The ball bearings 26 are disposed above the liquid surface of the polymerization solution 18. In this constitution, the rotation of the first driven roller 23 is smooth. It also prevents occurrence of rotation failure of ball bearings 26 due to sticking of polymerization solution 18. Accordingly, the first driven roller 23 adheres the conductive tape 16, and operates together with the band-shaped core material 5. As a result, the core material 5 is moved without being interfered.

Figure 12:
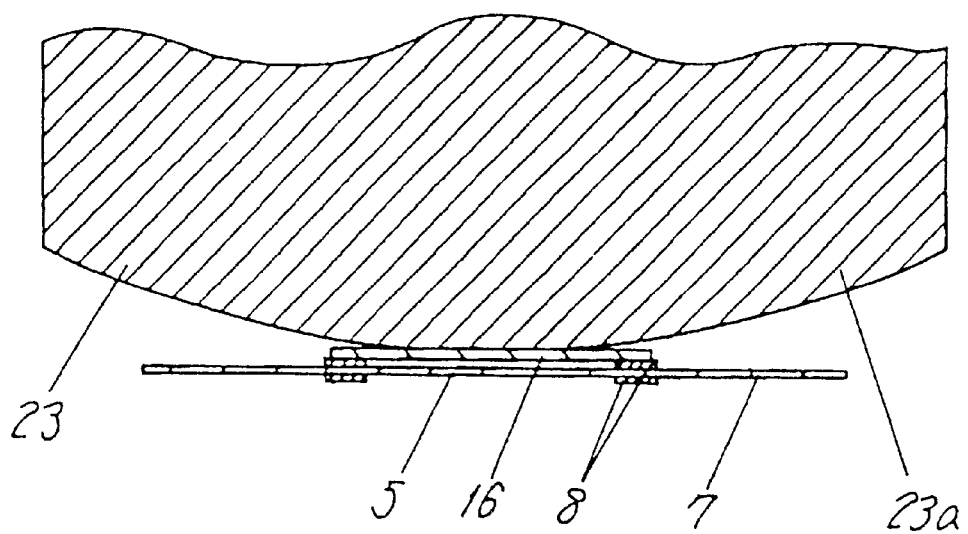
FIG. 12 an essential magnified sectional view of the first driven roller in FIG. 11.

Also as shown in FIG. 11 and FIG. 12, the center line portion of the outer circumference 23a of the first driven roller 23 has a curved surface projecting in the outer circumferential direction. In this constitution, the core material 5 is prevented from being deviated inn position from the center line portion of the first driven roller 23. As a result, the core material 5 is stably guided into one side of the polymerization tank 17 by the first driven roller 23.

Figure 13:
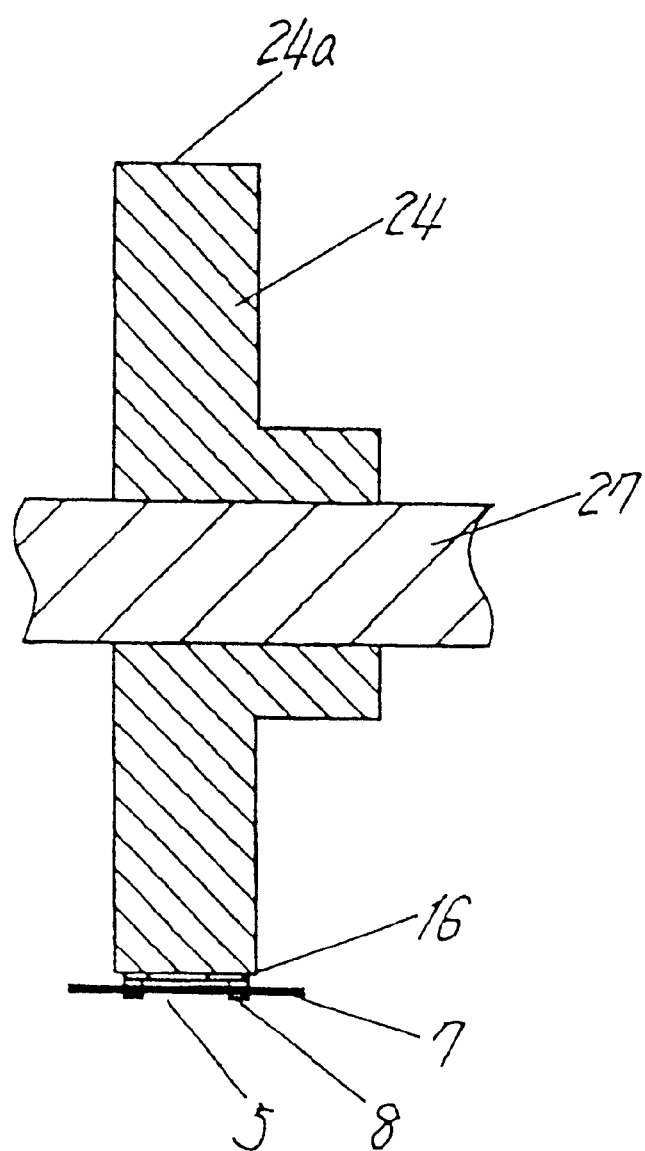
FIG. 13 is a sectional view of a first tension roller used in the polymerization tank for forming a polymerization film in the manufacturing method of solid electrolytic capacitor in the embodiment of the invention.

As shown in FIG. 7 and FIG. 13, one drive shaft 27 penetrates the center shaft of the plurality of first tension rollers 24. Thus, by driving the plurality of parallel first tension rollers 24 by one drive shaft 27, the drive mechanism is simplified. In each one of the parallel polymerization tanks 17, the first tension roller 24 is almost uniform. In addition, the tension applied to the band-shaped core material 5 is nearly uniform. Accordingly, the moving state of the band-shaped core material 5 in each polymerization tank 17 is stable, so that a polymerization film is formed stably.

As shown in FIG. 13, the outer circumference 24a of each first tension roller 24 has a flat surface. In this constitution, the outer circumference 24a and the band-shaped core material 5 to which the conductive tape 16 is adhered contact and slide on a flat surface. In this constitution, tension application by the first tension roller 24 is stabilized.

Although not shown in the drawings, the bottom of the polymerization tank 17 in FIG. 7 has a constitution for passing water controlled in temperature to a specified temperature. The water controlled in temperature to a specified temperature has a larger thermal capacity than gas, and hence the temperature of the polymerization solution 18 in the polymerization tank 17 is easily stabilized at the specified temperature. As a result, the polymerization reaction is stable.

As shown in FIG. 7 and FIG. 8, a lid 28 is fitted to the opening at the upper side of each long polymerization tank 17. The lower part of a spacer 29 provided at the lower side of this lid 28 is pushed into the polymerization solution 18. In this constitution, the evaporation space above the polymerization solution 18, and the exposed area of the surface of the polymerization solution 18 are decreased. As a result, the evaporation amount of the polymerization solution 18 is decreased, and the economy is improved.

Besides, since the spacer is pushed into the polymerization solution, the liquid level may be higher if the volume of the polymerization solution 18 is small. In this constitution, the distance between the negative electrode 19 and the band-shaped core material 5 may be extended. As a result, bubbles formed in the negative electrode 19 hardly stick to the portion of the band-shaped core material 5. As a result, a polymerization film is formed stably on the cathode lead-out portion 10 of the capacitor element 7 of the band-shaped core material 5.

Back to FIG. 8, the lower part of the spacer 29 in the polymerization tank 17 has such a structure as to move the core material 5 to which the conductive tape 16 is adhered from one side to other side of the polymerization tank 17. By moving the core material 5 to which the conductive tape 16 is adhered in the lower part in the polymerization tank 17 underneath the spacer 29, the oligomer generated at the time of forming the polymerization film settles in the downward portion of the core material 5. As a result, the forming efficiency of polymerization film is enhanced.

The lower part of the spacer 29 has a slope inclined upward. In this constitution, bubbles formed in the negative electrode 19 move upward. In the capacitor element 7 of the band-shaped core material 5 moving below, the forming efficiency of polymerization film is enhanced.

Together with the above constitution, the negative electrode 19 is disposed above the lower end of the spacer 29. This negative electrode 19 is inclined upward. Accordingly, bubbles formed in the negative electrode 19 move upward, and hardly stay at the lower end of the spacer 29. As a result, in the capacitor element 7 of the band-shaped core material 5 moving below, the forming efficiency of polymerization film is improved.

The spacer 29 is made of vinyl chloride. Hence, the spacer 29 does not degenerate, and the polymerization solution 18 does not degenerated due its degeneration. As a result, a polymerization film is formed stably on the capacitor element 7 of the band-shaped core material 5.

As shown in FIG. 8, the moving part 17a of the core material 5 in the lower part of the polymerization tank 17 has a smaller sectional area than the storage part 17b of the upper spacer 29 and negative electrode 19. In this constitution, disturbance of polymerization solution 18 formed in the storage part 7b has hardly any effect on the lower moving part 7a. As a result, in the moving part 7a of the core material 5, a polymerization film is formed stably on the capacitor element 7.

Also in FIG. 8, the conductive tape 16 is adhered only to the upper side of the core material 5. At the upper side of the core material 5 at the upper side of the negative electrode 19, the conductive tape 16 is adhered. Accordingly, formation of polymerization film from the upper side of the conductive tape 16 starts, and consequently the polymerization film is formed so as to grow from the conductive tape 16 to the face side and back side of the cathode lead-out portion 10 of the capacitor element 7. Since the conductive tape 16 is not disposed at the lower side of the core material 5, the adhering step of conductive tape 16 to the lower side is not necessary. As a result, the productivity is enhanced.

As shown in FIG. 6, a weir 30 is installed in the liquid level part between the immersing part of the core material 5 into the polymerization solution 18 at one side of the polymerization tank 17, and the first driven roller 23. By this weir 30, when the core material 5 moves to the part to be immersed in the polymerization solution 18, bubbles formed in the negative electrode are prevented from sticking to the core material 5. Bubbles formed in the negative electrode and floating to the liquid surface are prevented from moving in the direction of the core material 5. Sticking of bubbles to the core material 5 is avoided. Moreover, defective forming of polymerization film due to bubbles is prevented.

Figure 15:
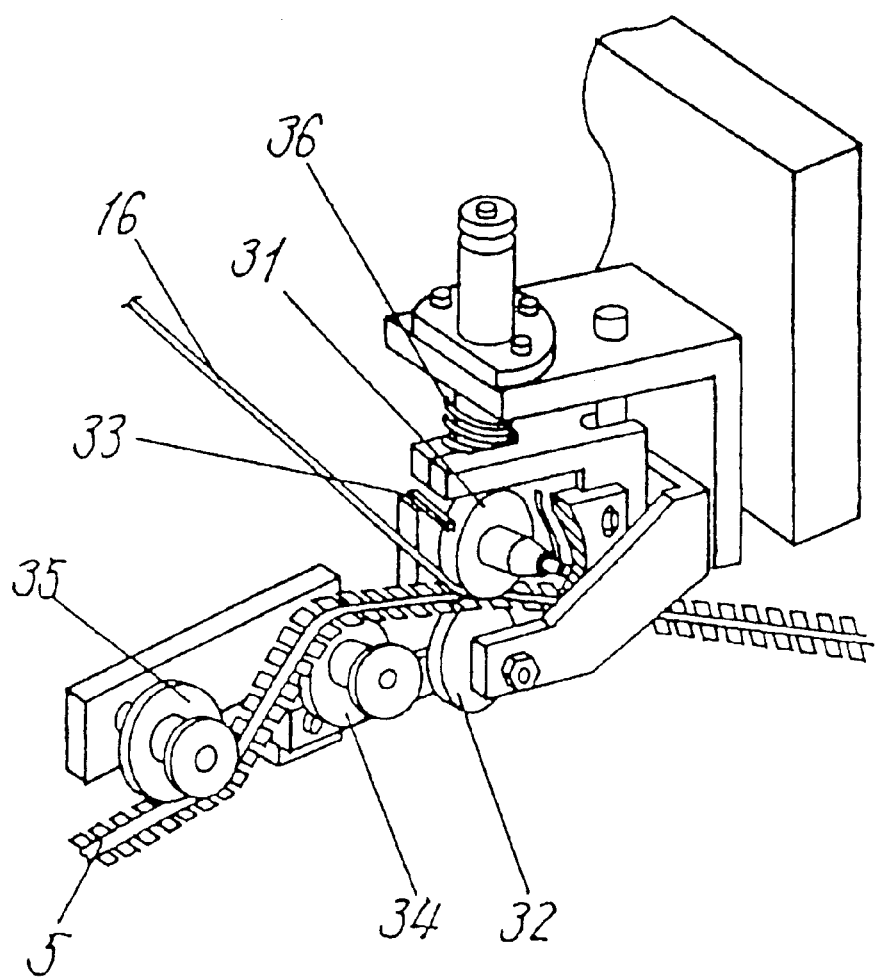
FIG. 15 is a perspective view of a first current feed roller used in the polymerization tank for forming a polymerization film in the manufacturing method of solid electrolytic capacitor in the embodiment of the invention.
Figure 16:
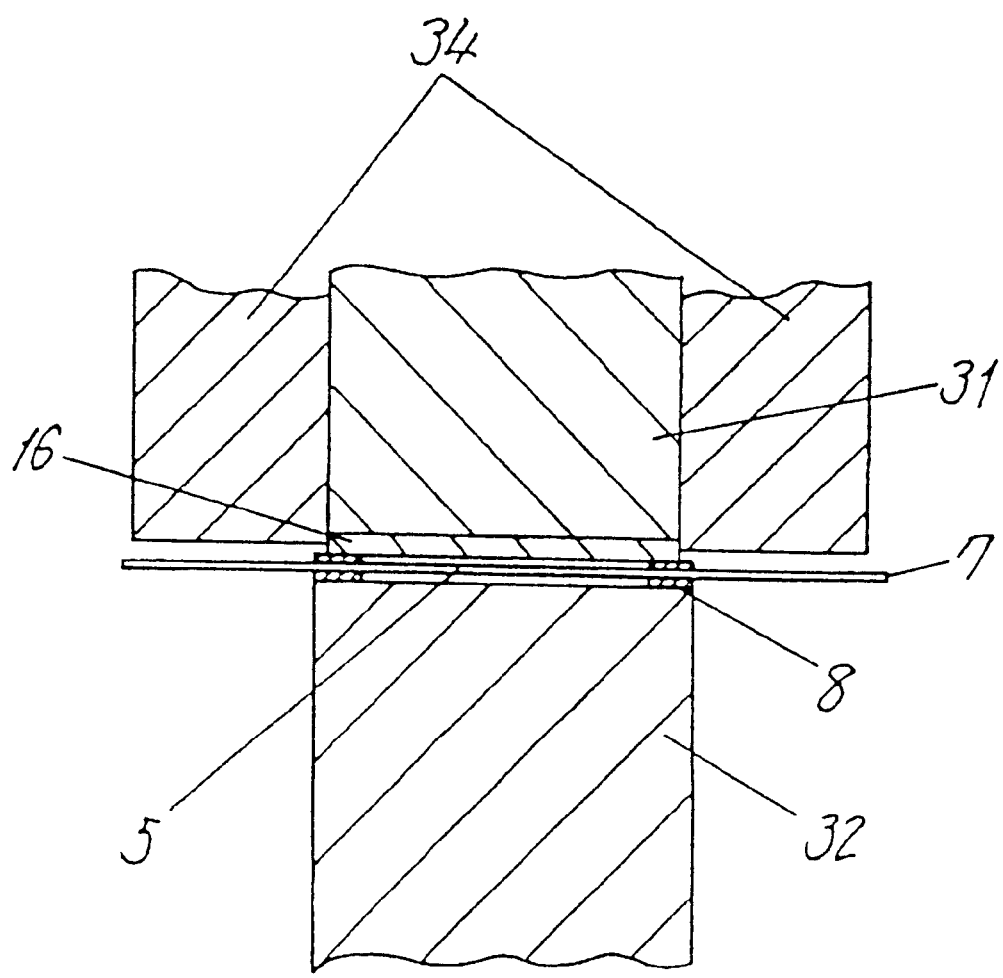
FIG. 16 is a sectional view of the first current feed roller used in the polymerization tank for forming a polymerization film in the manufacturing method of solid electrolytic capacitor in the embodiment of the invention.

As shown in FIG. 6, FIG. 15, and FIG. 16, at one side of the polymerization tank 17, a first current feed roller 31 for composing first voltage applying means is disposed. By this current feed roller 31 and a lower roller 32, the conductive tape 16 is adhered to the core material 5. Since the first voltage applying means is composed of the first current feed roller 31 for pressing the conductive tape 16 to the core material 5, the constitution is simplified. Further, since the first current feed roller 31 presses the conductive tape 16 to the core material 5, this conductive tape 16 is kept in a pressed state. Hence, application of voltage to the conductive tape 16 is stable. As a result, a polymerization film is stably formed on the capacitor element 7.

A dust collecting squeegee 33 abuts against the outer circumference of the first current feed roller 31. In this constitution, dust and foreign matter are removed from the outer circumference of the first current feed roller 31. Hence, voltage can be applied stably from the first current feed roller 31 to the conductive tape 16. As a result, a polymerization film is formed stably on the capacitor element 7.

As shown in FIG. 16, a guide 34 for preventing lateral deviation of the conductive tape 16 is provided. On the other hand, second and third driven rollers 34, 35 in FIG. 15 prevent lateral deviation of the core material 5.

That is, at the upstream side of the first current feed roller 31 for composing the first voltage applying means, there are second and third driven rollers 34, 35 projecting in the outer circumferential direction in the center line portion of the outer circumference. Through these second and third driven rollers 34, 35, the core material 5 is supplied in the direction of the first current feed roller 31. Since the center line portion of the outer circumference of the second and third driven rollers 34, 35 is projecting in the outer circumferential direction, deviation of the band-shaped core material 5 is corrected by the second and third driven rollers 34, 35. Therefore, the core material 5 moves into the first current feed roller 31 without deviation. As a result, adhering of core material 5 to the conductive tape 16, and application of voltage to the conductive tape 16 are done stably.

In FIG. 15, meanwhile, a spring 36 is provided for thrusting the first current feed roller 31 to the roller 32 side.

Figure 14:
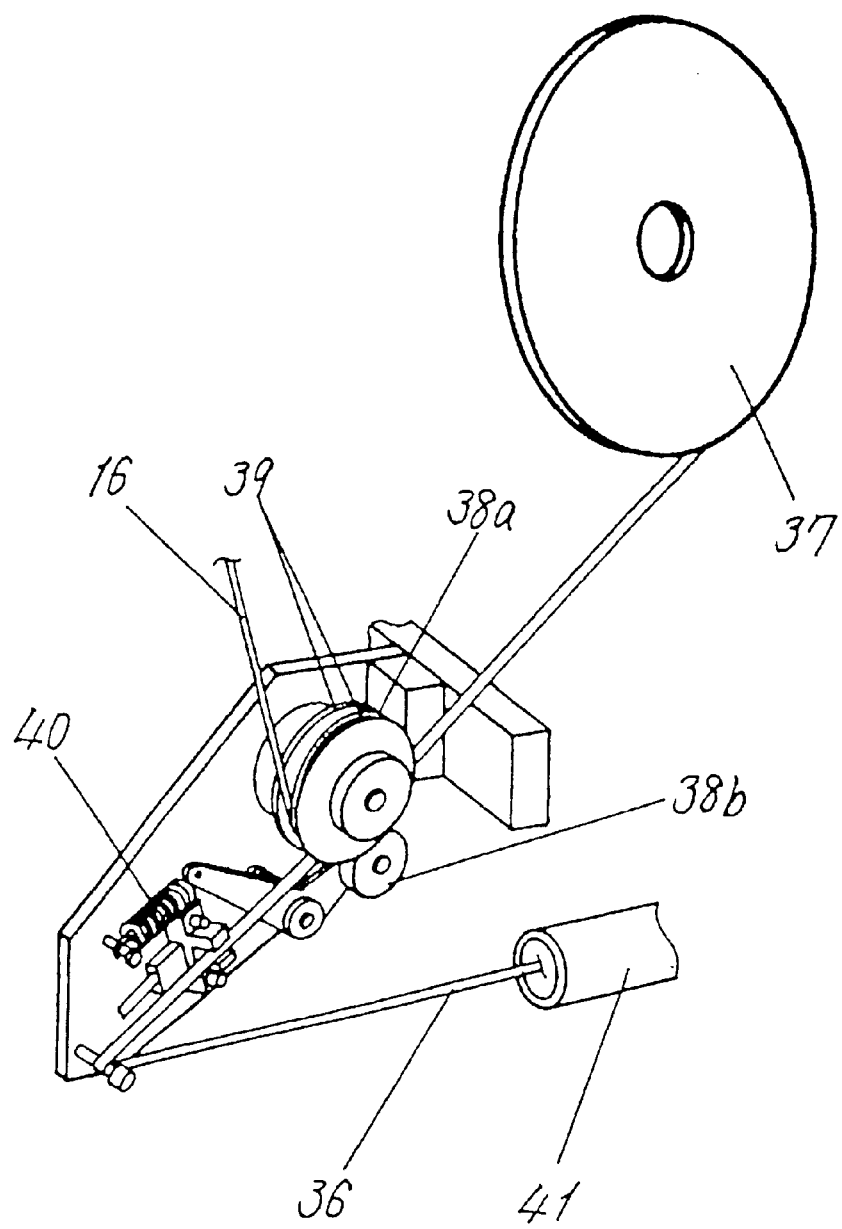
FIG. 14 is a perspective view of a second tension roller used in the polymerization tank for forming a polymerization film in the manufacturing method of solid electrolytic capacitor in the embodiment of the invention.

As shown in FIG. 6 and FIG. 14, at the upstream side of the first current feed roller 31, a reel 37 is installed in a laminated state of the conductive tape 16 and resin-made separator 36. Between this reel 37 and first current feed roller 31, second tension rollers 38a, 38b are installed. At the downstream side of the second tension rollers 38a, 38b, the separator 36 is peeled off from the conductive tape 16. That is, the conductive tape 16 and separate 36 are laminated with each other, and the laminated conductive tape 16 and separator 36 are wound around the reel 37. Therefore, the conductive tape 16 being let off from the reel 37 is hardly set in curled state even after the separator 36 is peeled off. Accordingly, the conductive tape 16 is stably supplied into the first current feed roller 31 at the downstream side, and the conductive tape 16 is stably adhered to the band-shaped core material 5.

In FIG. 6, the laminated body of the conductive tape 16 and separator 36 is held by the second tension rollers 38a, 38b. The tension outside of one side of the polymerization tank 17 is applied to the separator. In this case, since the conductive tape 16 and separator 36 are formed in a laminated body, this laminated body has a high strength, and a sufficient tension can be applied.

As shown in FIG. 14, a position defining plate 39 of conductive tape 16 is disposed at both sides of the second tension roller 38a. In this constitution, in the part of the second tension roller 38a, deviation of the laminated body of the conductive tape 16 and separator 36 is prevented. Accordingly, a required tension is stably applied by the second tension rollers 38a, 38b.

In FIG. 14, a spring 40 has a role of thrusting the second tension roller 38b to the 38a side.

A suction duct 41 has a role of sucking and recovering the peeled separator 36.

Figure 17:
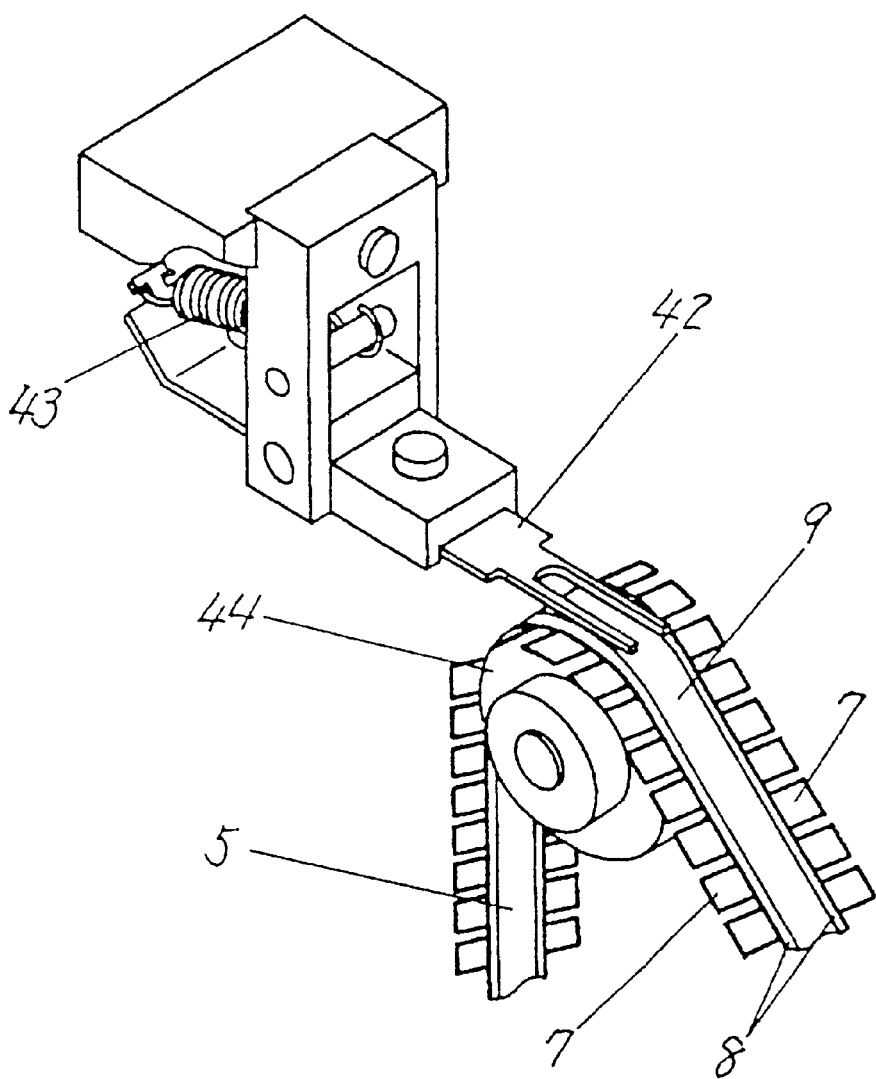
FIG. 17 is a perspective view of a voltage application terminal unit used in the polymerization tank for forming a polymerization film in the manufacturing method of solid electrolytic capacitor in the embodiment of the invention.

As shown in FIG. 17, at the upstream side of the second and third driven rollers 34, 35 in FIG. 6, a voltage application terminal 42 contacts with the anode lead-out portion 9 of the core material 5. The voltage applied from this voltage application terminal 42 to the core material 5 is a voltage between the energization voltage to the conductive tape 16 by a first current feed roller 31 mentioned below and the energization voltage to the negative electrode 19, and is same as the voltage in the portion of the conductive tape immersed in the polymerization solution or a higher voltage. The relation of these voltages is described in detail later.

The formation film on the surface of the core material 5 is an aluminum oxide film. The voltage application terminal 42 is made of stainless steel. The stainless steel has an excellent weather resistance. When the voltage application terminal 42 is pressed to the lower roller 44 side by a spring 43, the aluminum oxide film on the surface of the band-shaped core material 5 is broken by the voltage application terminal 42, so that the voltage may be applied stably. Further, when the terminal 42 is rubbed by the hard aluminum oxide film, the stainless steel surface is also scarred, and the surface of the stainless steel is exposed. As a result, the voltage is applied stably from the terminal 42 to the core material 5.

Figure 18:
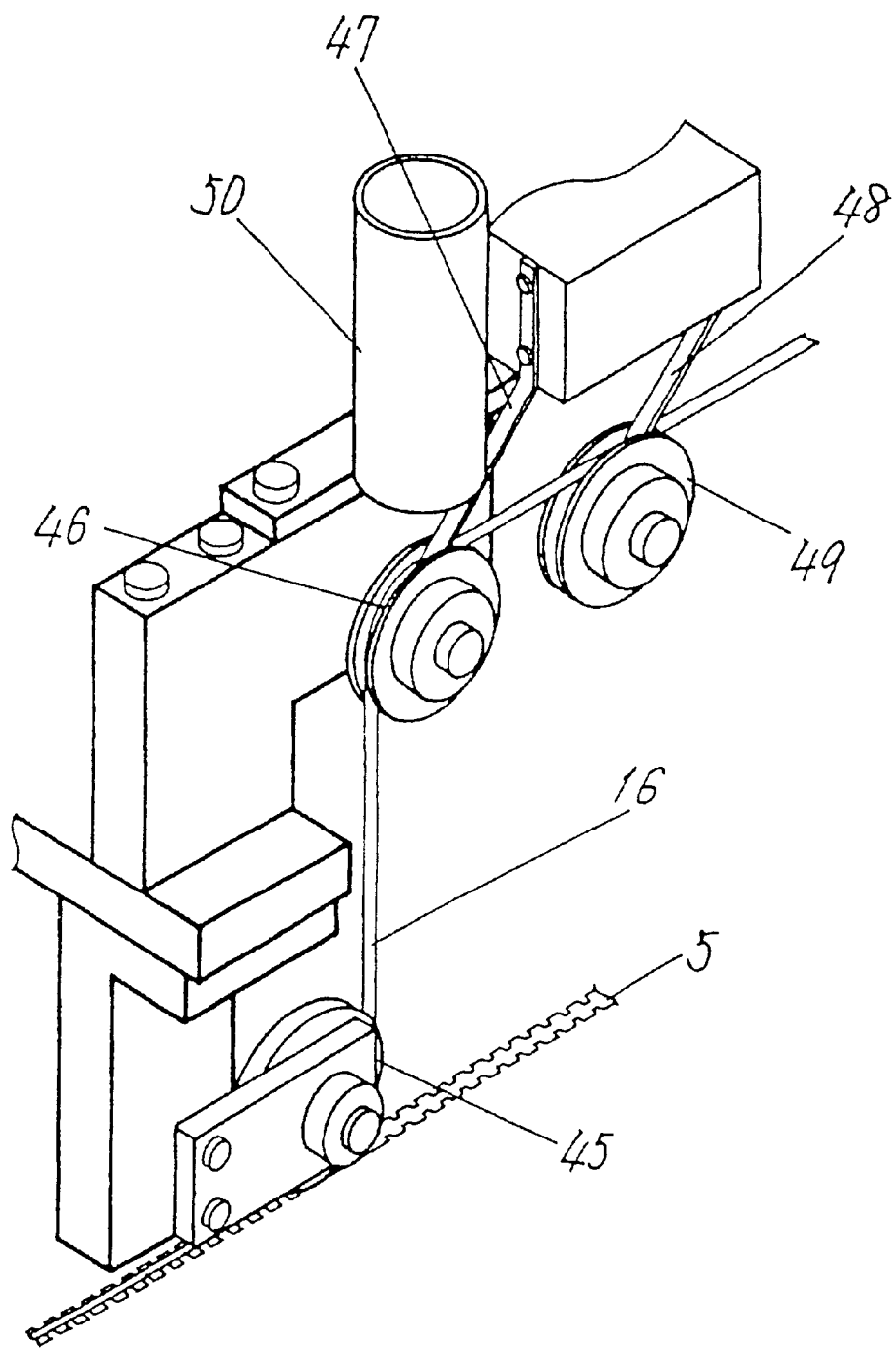
FIG. 18 a perspective view of a peeling roller used in the polymerization tank for forming a polymerization film in the manufacturing method of solid electrolytic capacitor in the embodiment of the invention.

As shown in FIG. 18, at the downstream side of the first tension roller 24 in FIG. 6, a peeling roller 45 is disposed outside of the polymerization solution 18 in the polymerization tank 17. By this peeling roller 45, the conductive tape 16 is peeled from the core material 5 in the orthogonal direction. In this constitution, the conductive tape 16 is peeled from the core material 5 smoothly. Accordingly, in this portion, it is peeled off stably, favorably and smoothly. As a result, the conductive tape 16 and core material 5 are smoothly moved to the downstream side individually. At the same time, cutting of the core material 5 made of aluminum foil is prevented.

In the running path of the conductive tape 16 at the downstream side of the peeling roller 45 in FIG. 6 and FIG. 18, a cracking roller 46 of a smaller diameter than this peeling roller 45 is disposed. By this cracking roller 46, the running path of the conductive tape 16 is bent in the orthogonal direction.

In this constitution, the polymerization film on the conductive tape 16 is cracked, and by this cracking, the polymerization film can be easily removed from the conductive tape by a first peeling pawl 47 and a second peeling pawl 48 in a subsequent process.

At the lower side of the conductive tape 16 of the first peeling pawl 47 and second peeling pawl 48, the peeling roller 46 and a roller 49 are disposed. In this constitution, the first peeling pawl 47 and second peeling pawl 48 can be firmly pressed to the upper side of the conductive tape 16. As a result, the effect of peeling the polymerization film from the upper side of the conductive tape 16 is enhanced.

Figure 19:
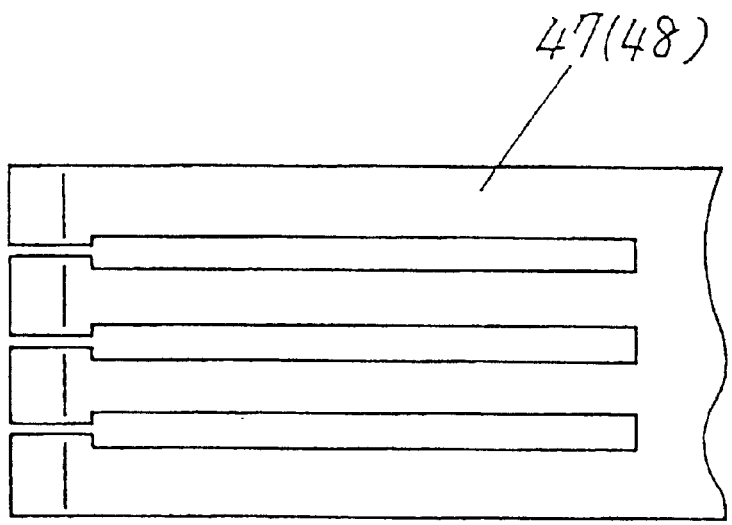
FIG. 19 is a plan of a first peeling pawl used in the polymerization tank for forming a polymerization film in the manufacturing method of solid electrolytic capacitor in the embodiment of the invention.
Figure 20:
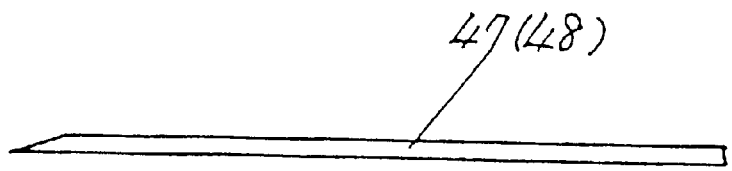
FIG. 20 is a sectional view of the first peeling pawl used in the polymerization tank for forming a polymerization film in the manufacturing method of solid electrolytic capacitor in the embodiment of the invention.

As shown in FIG. 19 and FIG. 20, at least one of the first peeling pawl 47 and second peeling pawl 48 has a leading end branched into a plurality. In this constitution, the removing effect of the polymerization film at the leading end is enhanced.

After the conductive tape 16 is bent by the cracking roller 46, the first peeling pawl 47 contacts with the surface of the conductive tape 16. In this constitution, the cracked polymerization film is easily removed by the first peeling pawl 47. A large amount of polymerization film removed by the first peeling pawl 47 is sucked and removed by suction means 50 disposed on the surface of the first peeling pawl 47. As a result, re-sticking of the polymerization film at the upstream or downstream is prevented, and occurrence of troubles is prevented.

The running path of the conductive tape 16 between the peeling roller 45 and cracking roller 46 has a space for drying the polymerization film on the surface of the conductive tape 16. By drying the polymerization film sufficiently at this position, cracks may be effectively formed in the polymerization film on the conductive tape 16 by the cracking roller 46. Accordingly, it is much easier to remove by the first peeling pawl 47 and second peeling pawl 48 in the subsequent process.

Figure 21:
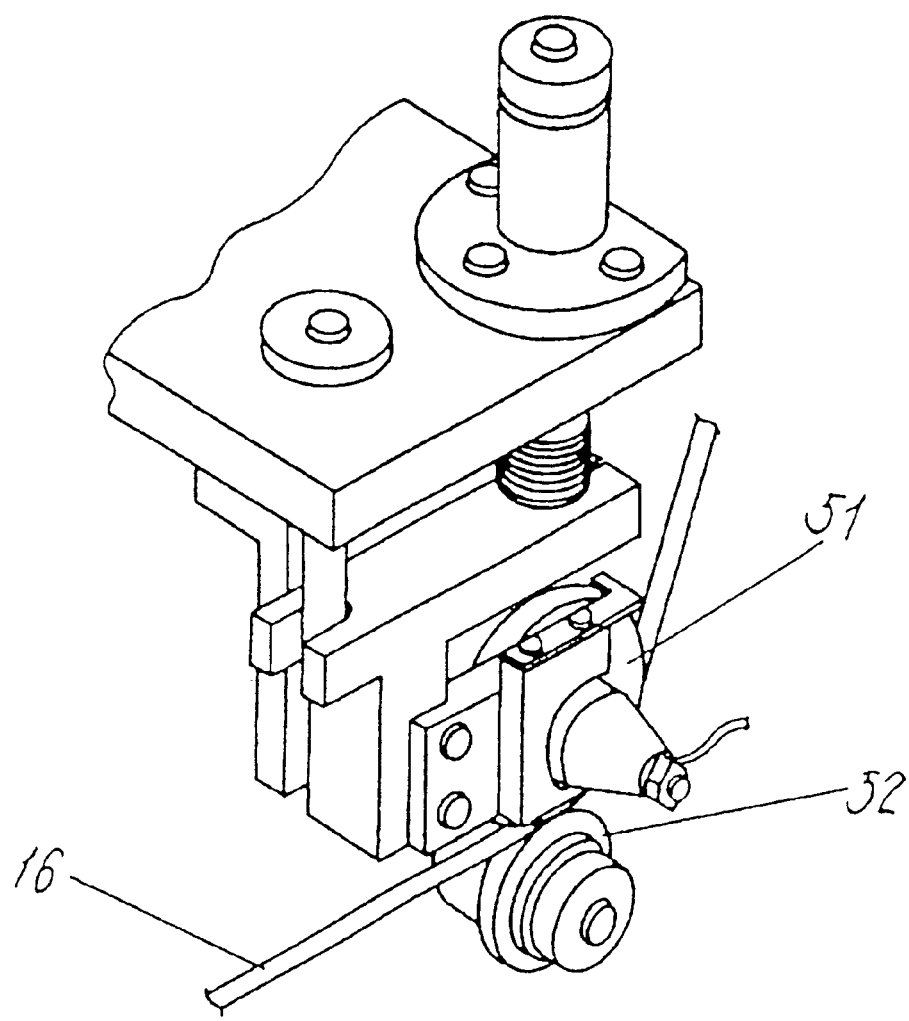
FIG. 21 is a perspective view of a second current feed roller used in the polymerization tank for forming a polymerization film in the manufacturing method of solid electrolytic capacitor in the embodiment of the invention.

As shown in FIG. 21, at the downstream side of the second peeling pawl 48 in FIG. 6, a second current feed roller 51 for composing second voltage applying means is disposed, and also a roller 52 is disposed underneath the conductive tape 16 in this portion. In this constitution, at one side of the polymerization tank 17 of the conductive tape 16, a voltage is applied from the first current feed roller 31, and at other side by applying a voltage from the second current feed roller 51, the forming efficiency of polymerization film is enhanced.

In the running path of the conductive tape 16 at the downstream side of the second current feed roller 51 in FIG. 6, tension rollers 53a, 53b are disposed for pulling the conductive tape 16. By puling the conductive tape by the tension rollers 53a, 53b, the band-shaped core material 5 can be moved from one side to other side of the polymerization tank 17. By applying this tensile force only to the conductive tape 16 by the tension rollers 53a, 53b, breakage of the band-shaped core material 5 can be prevented.

At the downstream side of the second current feed roller 51, by disposing the tension rollers 53a, 53b, when the conductive tape 16 passes the second current feed roller 51, tension is also applied to the conductive tape 16. Hence, it prevents formation of gap between the second current feed roller 51 and conductive tape 16. As a result, the voltage is supplied stably from the second current feed roller 51 to the conductive tape 16.

As shown in FIG. 6, a take-up reel 54 of conductive tape 16 is disposed at the downstream side of the tension rollers 53a, 53b. In this constitution, in the process after the tension rollers 53a, 53b, the conductive tape 16 can be taken up smoothly. As a result, malfunction due to entangling of the conductive tape 16 or the like is prevented.

As mentioned above, the first current feed roller 31 is disposed at one side of the polymerization tank 17 as first voltage applying means for applying voltage to the conductive tape 16, and the second current feed roller 51 is disposed at other side of the polymerization tank 17 as second voltage applying means for applying voltage to the conductive tape 16. In such constitution, as indicated by line A in FIG. 9, the central part in the longitudinal direction of the conductive tape 16 has the lowest potential. As a result, large potential fluctuation can be suppressed.

Figure 9:
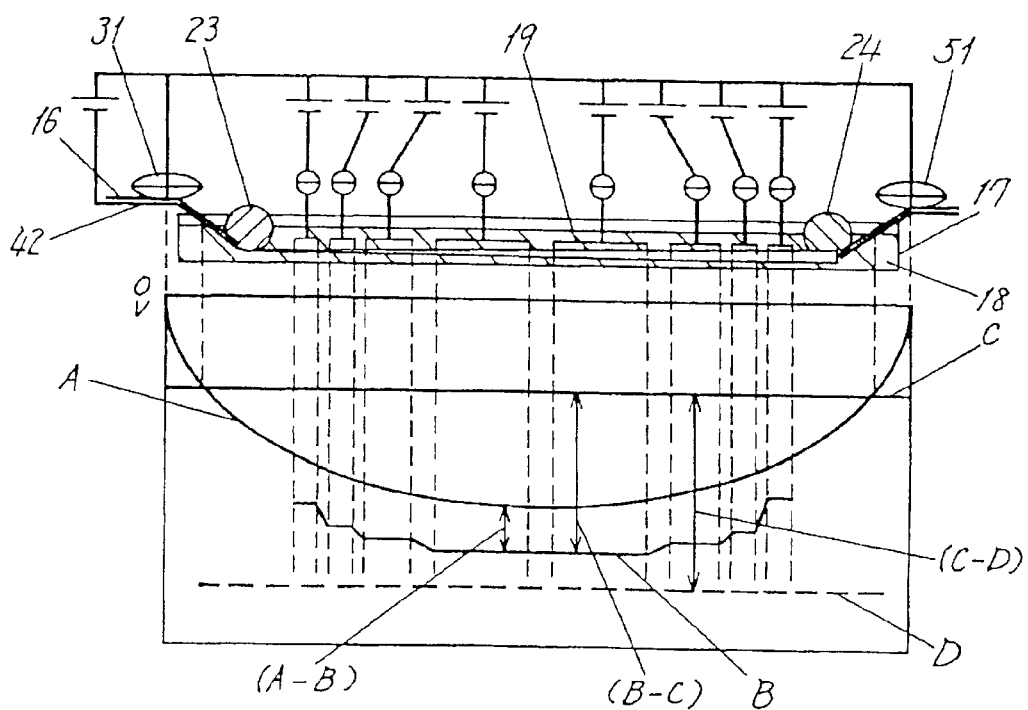
FIG. 9 is an electric block diagram of the polymerization tank for forming a polymerization film in the manufacturing method of solid electrolytic capacitor in the embodiment of the invention.

On the other hand, a plurality of negative electrodes 19 are disposed at specified intervals in the longitudinal direction in the polymerization tank 17. The both inner and outer negative electrodes of the plurality of negative electrodes 19 are as shown in FIG. 9, in which the voltage of the conductive tape 16 applied from the first current feed roller 31 and second current feed roller 51 is high as indicated by line A, and therefore it is heightened as indicated by line B. Since the voltage is low in the central part of the conductive tape 16, the voltage of the negative electrode 19 is gradually lower toward the central part side. Therefore, the potential difference (A–B) of the potential of the conductive tape 16 at each part in the longitudinal direction and the potential of the corresponding negative electrode 19 is nearly constant. Thus, the polymerization film is formed stably.

The voltage applied from the voltage applying terminal 42 to the core material 5 is indicated by C in FIG. 9. This voltage is constant because no current flows.

The foil load voltage applied to the core material 5 is (C–B). By lowering the voltage C, increase of foil load voltage is prevented. Therefore, it prevents breakdown of the formation film formed on the face and back sides of the core material 5.

The withstand voltage of the formation film is (C–D). The voltage must be applied so that (B–C) may settle between (C–D). By spacing the plurality of negative electrodes 19 at specified intervals, bubbles formed in each negative electrode 19 are prevented from staying still in the adjacent negative electrodes 19, and the polymerization reaction in this area proceeds without trouble. As a result, the polymerization film of each capacitor element 7 is formed stably.

The negative electrode 19 is made of stainless steel or nickel. In this constitution, deterioration of the negative electrode 19 is prevented. As a result, a polymerization film is formed in the capacitor elements 7 of the parts of the band-shaped material 5 stably for a long period.

The conductive tape 16 is made of stainless steel or nickel. In this constitution, when performing polymerization reaction by applying a voltage to the conductive tape 16, the conductive tape 16 is prevented from eluting into the polymerization solution 18. Hence, polymerization reaction is conducted stably by using the conductive tape 16.

Figure 10:
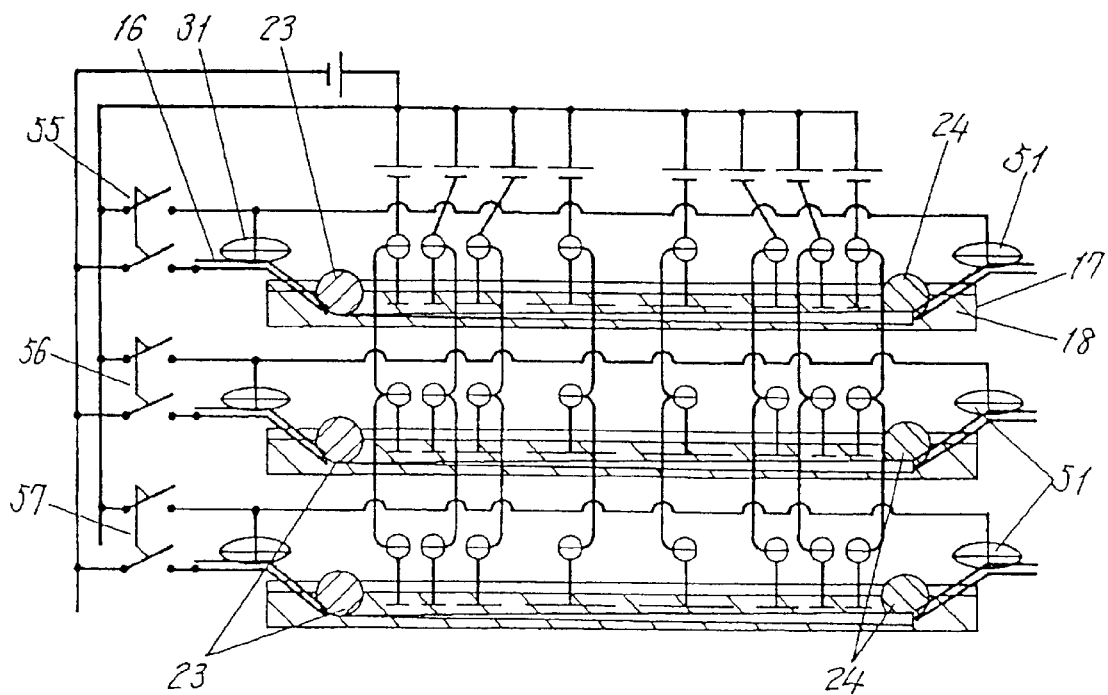
FIG. 10 is an electric block diagram of other polymerization tank for forming a polymerization film in the manufacturing method of solid electrolytic capacitor in the embodiment of the invention.

FIG. 10 shows energization in each polymerization tank 17 of the plurality of polymerization tanks 17 as shown in FIG. 7. Switches 55 to 57 are provided independently for individual polymerization tanks 17. By the individual constitution, polymerization reaction is performed independently in each tank.

The polymerization solution 18 supplied into the polymerization tank 17 from the overflow 21 at one side of the polymerization tank in FIG. 6 has a mixed polymerization solution mixing the polymerization solution 18 flowing out of the polymerization tank 17 from the overflow 21 at other side of the polymerization tank 17. In the polymerization solution 18 flowing out of the tank from other side of the polymerization tank 17, since oligomer is formed by polymerization reaction, by mixing it into the polymerization solution 18 flowing into the tank from one side of the polymerization tank 17, a polymerization film is formed efficiently in the capacitor element in the polymerization tank 17.

Thus, since the anode lead-out portion of the plurality of capacitor elements is adhered to the conductive tape, by applying a voltage to the conductive tape, the polymerization starting from the surface of the conductive tape spreads to the cathode lead-out portion of each capacitor element adhered to this conductive tape, and a polymerization film is formed on the cathode lead-out portion of each capacitor element. As a result, an excellent capacitor characteristic is obtained, and the productivity is enhanced remarkably.

What is claimed is:

1. A manufacturing apparatus of solid electrolytic capacitor comprising:
    a supplying device for supplying a core material having a plurality of capacitor elements, each capacitor element of said plurality of capacitor elements having an anode lead-out portion and a cathode lead-out portion,
    a formation film forming device for forming a formation film on the surface of said core material supplied by said supplying device,
    a conductive substance forming device for installing a conductive substance on said formation film formed by said formation film forming device,
    an adhering device for adhering a conductive tape to said core material provided by said conductive substance forming device,
    a polymerization device for forming a conductive polymerization film on a surface of the cathode lead-out portion of said core material provided by said adhering device, and
    a peeling device for peeling said conductive tape from said core material provided by said polymerization device.

2. The manufacturing apparatus of solid electrolytic capacitor of claim 1, wherein said core material has a band shape.

3. The manufacturing apparatus of solid electrolytic capacitor of claim 2, wherein said polymerization device has a long shape.

4. The manufacturing apparatus of solid electrolytic capacitor of claim 2, wherein said core material has a plurality of capacitor elements projected and formed integrally in the direction orthogonal to the longitudinal direction, in the longitudinal direction of said core material, said anode lead-out portion is positioned at a root side of the plurality of projected capacitor elements.

5. The manufacturing apparatus of solid electrolytic capacitor of claim 2, wherein said core material further comprising an insulating tape for separating said anode lend-out portion from said cathode lead-out portion in a central region in a longitudinal direction of said core material,
    wherein said insulating tape has a smoother surface than said core material, and said conductive tape is adhered to said insulating tape at said adhering device.

6. The manufacturing apparatus of solid electrolytic capacitor of claim 3, wherein said polymerization device has a plurality of long-shaped polymerization tanks installed in parallel, and said core material having said anode lead-out portion adhered to said conductive tape is immersed in a polymerization solution in a long-shaped polymerization tank of said long-shaped polymerization tanks.

7. The manufacturing apparatus of solid electrolytic capacitor of claim 3, wherein said polymerization solution flows into the polymerization device from one end side of a long-shaped polymerization tank, and flows out of said polymerization device from other end side of said long-shaped polymerization tank.

8. The manufacturing apparatus of solid electrolytic capacitor of claim 3, wherein said core material gets into said polymerization solution from one end side of said polymerization device, and moves out of said polymerization solution from other end side, and said polymerization solution flows into said polymerization device from one end side of said polymerization device, and flows out from the other end side of said polymerization device, and flow speed of said polymerization solution and moving speed of said core material are nearly the same.

9. The manufacturing apparatus of solid electrolytic capacitor of claim 3, further comprising a first driven roller installed at one side in said polymerization device, and a first tension roller installed at other side in said polymerization device,
    wherein at least a lower part of said first driven roller is immersed in said polymerization solution, at least a lower part of said first tension roller is immersed in said polymerization solution, and said core material abuts against the lower part of said first driven roller and the lower part of said first tension roller, and is moved from the one side to the other side of said polymerization device.

10. The manufacturing apparatus of solid electrolytic capacitor of claim 9, wherein from above at one side of said polymerization device toward the lower part of said first driven roller, said core material is moved in said polymerization solution in an inclined state of 30° or less.

11. The manufacturing apparatus of solid electrolytic capacitor of claim 9, wherein said polymerization solution flows into said polymerization device from the upper direction than said first driven roller at one side of said polymerization device, and said polymerization device at one side has an inclined bottom downward to the direction of installation of said first driven roller.

12. The manufacturing apparatus of solid electrolytic capacitor of claim 6, further comprising first driven rollers installed at one side of each one of said long-shaped polymerization tanks,
    wherein a through-shaft penetrates a central shaft of said first driven rollers.

13. The manufacturing apparatus of solid electrolytic capacitor of claim 12, further comprising a ball bearing installed between said first driven rollers and said through-shaft.

14. The manufacturing apparatus of solid electrolytic capacitor of claim 9, wherein said first tension roller has a flat outer circumference, and said core material moves while contacting with said flat outer circumference of said first tension roller.

15. The manufacturing apparatus of solid electrolytic capacitor of claim 3, wherein said polymerization device has a spacer projecting into said polymerization solution from the upper surface of said polymerization a solution.

16. The manufacturing apparatus of solid electrolytic capacitor of claim 3, wherein said polymerization device has a lid installed in an opening of an upper surface, and a spacer installed at a lower side of said lid, and at least a part of said spacer is projecting into said polymerization solution.

17. The manufacturing apparatus of solid electrolytic capacitor of claim 3, wherein said polymerization device has an upper space and a lower space, said lower space has a smaller sectional area that said upper space, a spacer and a negative electrode are disposed in said upper space, and said core material passes through said lower space.

18. The manufacturing apparatus of solid electrolytic capacitor of claim 9, wherein said polymerization device has an immersion region for immersing said core material in said polymerization solution, and a weir installed on the liquid level between said immersing region and said first driven roller.

19. The manufacturing apparatus of solid electrolytic capacitor of claim 3, wherein said conductive tape is used for a positive electrode and said polymerization device has a plurality of negative electrodes disposed in the longitudinal direction.

20. The manufacturing apparatus of solid electrolytic capacitor of claim 19, wherein each negative electrode of said negative electrodes is disposed at a specified interval, and the voltage applied to each one of said negative electrodes is individually different.

21. The manufacturing apparatus of solid electrolytic capacitor of claim 19, wherein said negative electrodes are made of at least one of stainless steel and nickel.

22. The manufacturing apparatus of solid electrolytic capacitor of claim 1, wherein said polymerization device includes first voltage applying means installed at one side of said polymerization device and second voltage applying means installed at an other side, and each one of said first voltage applying means and said second voltage applying means applies a voltage to said conductive tape.

23. The manufacturing apparatus of solid electrolytic capacitor of claim 1, wherein said polymerization device includes a first current feed roller installed at one side of said polymerization device, and said first current feed roller adheres said conductive tape to said core material, presses said conductive tape to said core material, and applies a voltage to said conductive tape.

24. The manufacturing apparatus of solid electrolytic capacitor of claim 23, wherein the polymerization device includes a dust collecting squeegee abutting against the outer circumference of said first current feed roller, and deposits adhering to the outer circumference of said first current feed roller are removed by the dust collecting squeegee.

25. The manufacturing apparatus of solid electrolytic capacitor of claim 23, further comprising a second driven roller installed at an upstream side of said first current feed roller, and said second driven roller has an outer circumference projecting in an outer circumferential direction in a center line portion, and said core material is supplied in a direction of said first current feed roller through said second driven roller.

26. The manufacturing apparatus of solid electrolytic capacitor of claim 23, further comprising a reel installed at an upstream side of said first current feed roller,
wherein said reel coils said conductive tape in a laminated state through a separator, and said separator is peeled from said conductive tape between said reel and said first current feed roller.

27. The manufacturing apparatus of solid electrolytic capacitor of claim 26, further comprising a second tension roller installed between said reel and said first current feed roller, wherein the second tension roller grips a laminated body of said conductive tape and said separator,
wherein said separator is peeled from the conductive tape at a downstream side of said second tension roller.

28. The manufacturing apparatus of solid electrolytic capacitor of claim 27, further comprising a position defining plate disposed at both sides of the second tension roller,
wherein the position defining plate defines the position of said conductive tape.

29. The manufacturing apparatus of solid electrolytic capacitor of claim 9, further comprising a peeling roller installed outside of said polymerization solution in said long-shaped polymerization tank at a downstream side of said first tension roller,
wherein the peeling roller peels off said conductive tape in an orthogonal direction from said core material.

30. The manufacturing apparatus of solid electrolytic et capacitor of claim 29, further comprising a cracking roller installed in a running path of said conductive tape at the downstream side of said peeling roller,
wherein the cracking roller has a smaller diameter than said peeling roller, and said cracking roller bends the running path of said conductive tape in the orthogonal direction.

31. The manufacturing apparatus of solid electrolytic capacitor of claim 30, further comprising a first peeling pawl installed at a downstream side of said cracking roller,
wherein the first peeling pawl contacts with the surface of said conductive tape bent by said cracking roller.

32. The manufacturing apparatus of solid electrolytic capacitor of claim 31, further comprising a second current feed roller as a second voltage applying means installed at the downstream side of said second peeling pawl.

33. The manufacturing apparatus of solid electrolytic capacitor of claim 29, further comprising a tension roller installed on the running path of said conductive tape at the downstream side of the peeling roller,
wherein the tension roller pulls said conductive tape.

34. The manufacturing apparatus of solid electrolytic capacitor of claim 33, further comprising a take-up reel installed at the downstream side of said tension roller,
wherein the take-up reel takes up said conductive tape.

35. The manufacturing apparatus of solid electrolytic capacitor of claim 1, further comprising a peeling roller disposed at an end of said polymerization ice and other devices disposed at a downstream side of the peeling roller,
wherein said peeling roller peels off said conductive tape from said core material, and the other devices includes at least one selected from the group consisting of cracking roller, peeling pawl, roller, suction means, second current feed roller, tension roller, and take-up reel.

* * * * *

UNITED STATES PATENT AND TRADEMARK OFFICE
CERTIFICATE OF CORRECTION

PATENT NO. : 6,544,301 B2
DATED : April 8, 2003
INVENTOR(S) : Kobatake et al.

It is certified that error appears in the above-identified patent and that said Letters Patent is hereby corrected as shown below:

Column 26,
Line 60, delete "a".

Column 28,
Line 21, delete "et".
Line 50, "ice" should read -- device --.

Signed and Sealed this

Eleventh Day of November, 2003

JAMES E. ROGAN
*Director of the United States Patent and Trademark Office*